(12) United States Patent
Fujiwara et al.

(10) Patent No.: US 8,170,297 B2
(45) Date of Patent: May 1, 2012

(54) FACE AUTHENTICATION SYSTEM AND FACE AUTHENTICATION METHOD

(75) Inventors: Koji Fujiwara, Mishima-gun (JP); Daisaku Horie, Uji (JP)

(73) Assignee: Konica Minolta Holdings, Inc. (JP)

( * ) Notice: Subject to any disclaimer, the term of this patent is extended or adjusted under 35 U.S.C. 154(b) by 1141 days.

(21) Appl. No.: 12/009,294

(22) Filed: Jan. 17, 2008

(65) Prior Publication Data

US 2008/0175448 A1    Jul. 24, 2008

(30) Foreign Application Priority Data

Jan. 19, 2007    (JP) ................................ 2007-010487

(51) Int. Cl.
*G06K 9/00* (2006.01)
(52) U.S. Cl. ........................................ 382/118; 382/154
(58) Field of Classification Search .................. 382/118, 382/154, 218, 209
See application file for complete search history.

(56) References Cited

U.S. PATENT DOCUMENTS

| 7,006,672 B2 * | 2/2006 | Sato et al. .................... 382/118 |
| 7,257,239 B2 | 8/2007 | Rowe et al. .................... 382/118 |
| 7,324,670 B2 * | 1/2008 | Kozakaya et al. ............ 382/118 |
| 7,609,859 B2 * | 10/2009 | Lee et al. ...................... 382/118 |
| 7,715,596 B2 * | 5/2010 | Gehlen et al. ................. 382/118 |
| 7,853,085 B2 * | 12/2010 | Miller .......................... 382/215 |
| 7,865,937 B1 * | 1/2011 | White et al. ...................... 726/2 |
| 2004/0151349 A1 * | 8/2004 | Milne et al. ................... 382/115 |
| 2007/0104360 A1 * | 5/2007 | Huang et al. .................. 382/154 |
| 2009/0116732 A1 * | 5/2009 | Zhou et al. .................... 382/154 |

FOREIGN PATENT DOCUMENTS

JP    2003-162730 A    6/2003

* cited by examiner

*Primary Examiner* — Daniel Mariam
(74) *Attorney, Agent, or Firm* — Cantor Colburn LLP

(57) ABSTRACT

A face authentication system includes: a data processing section for performing a predetermined data processing operation; a first data input section for inputting three-dimensional data on a face area of a subject to the data processing section; and a second data input section for inputting two-dimensional image data on the face area of the subject to the data processing section, the two-dimensional image data corresponding to the three-dimensional data to be inputted to the data processing section, wherein the data processing section includes: a quality rating section for rating the quality of the three-dimensional data based on the two-dimensional image data, and generating quality data, and an authentication processing section for executing a registration process or a verification process of authentication data based on the three-dimensional data, if the quality data satisfies a predetermined requirement.

14 Claims, 22 Drawing Sheets

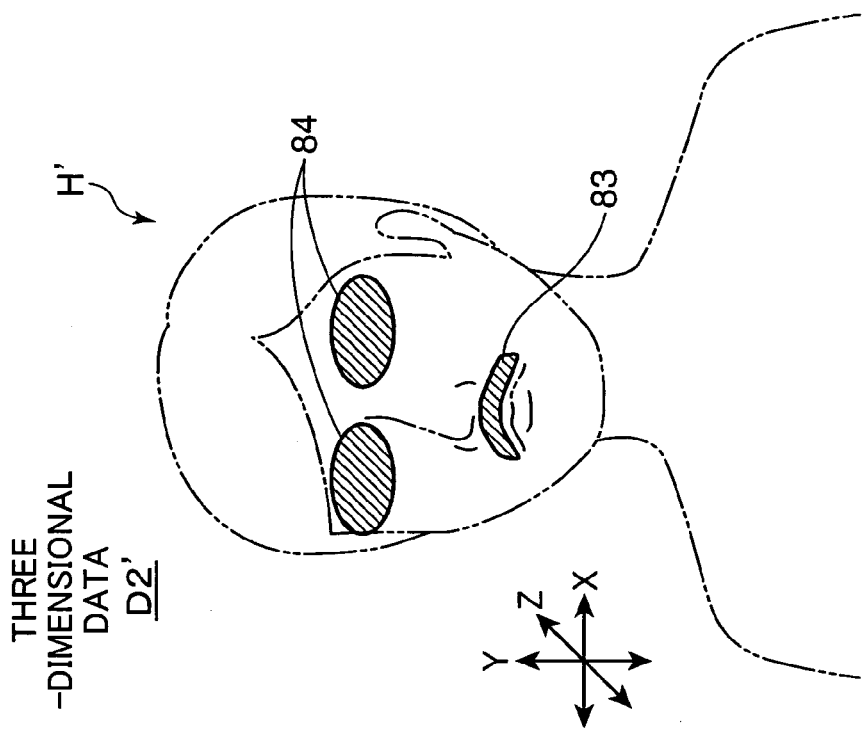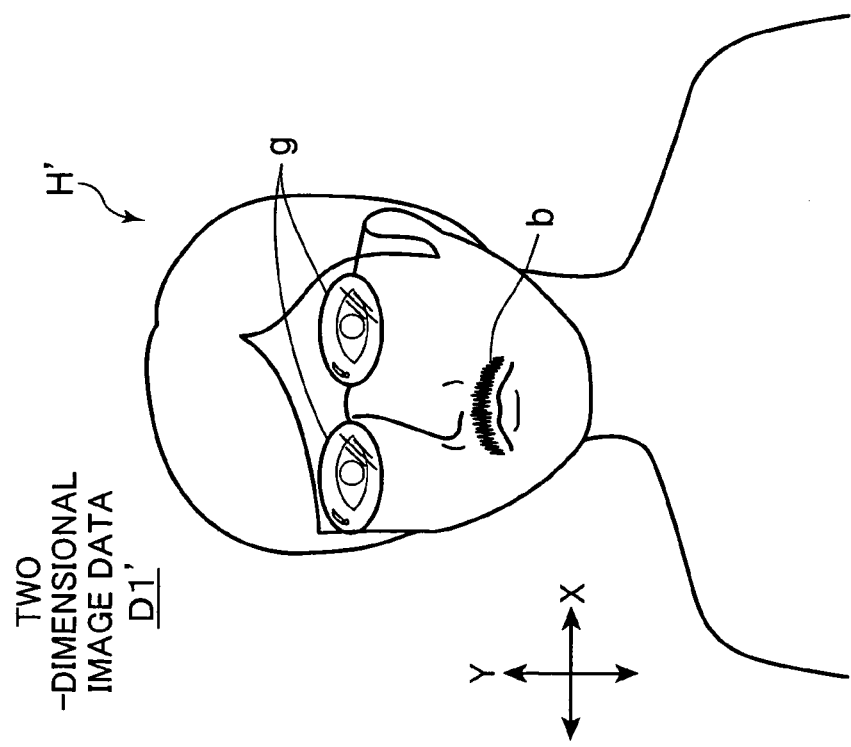

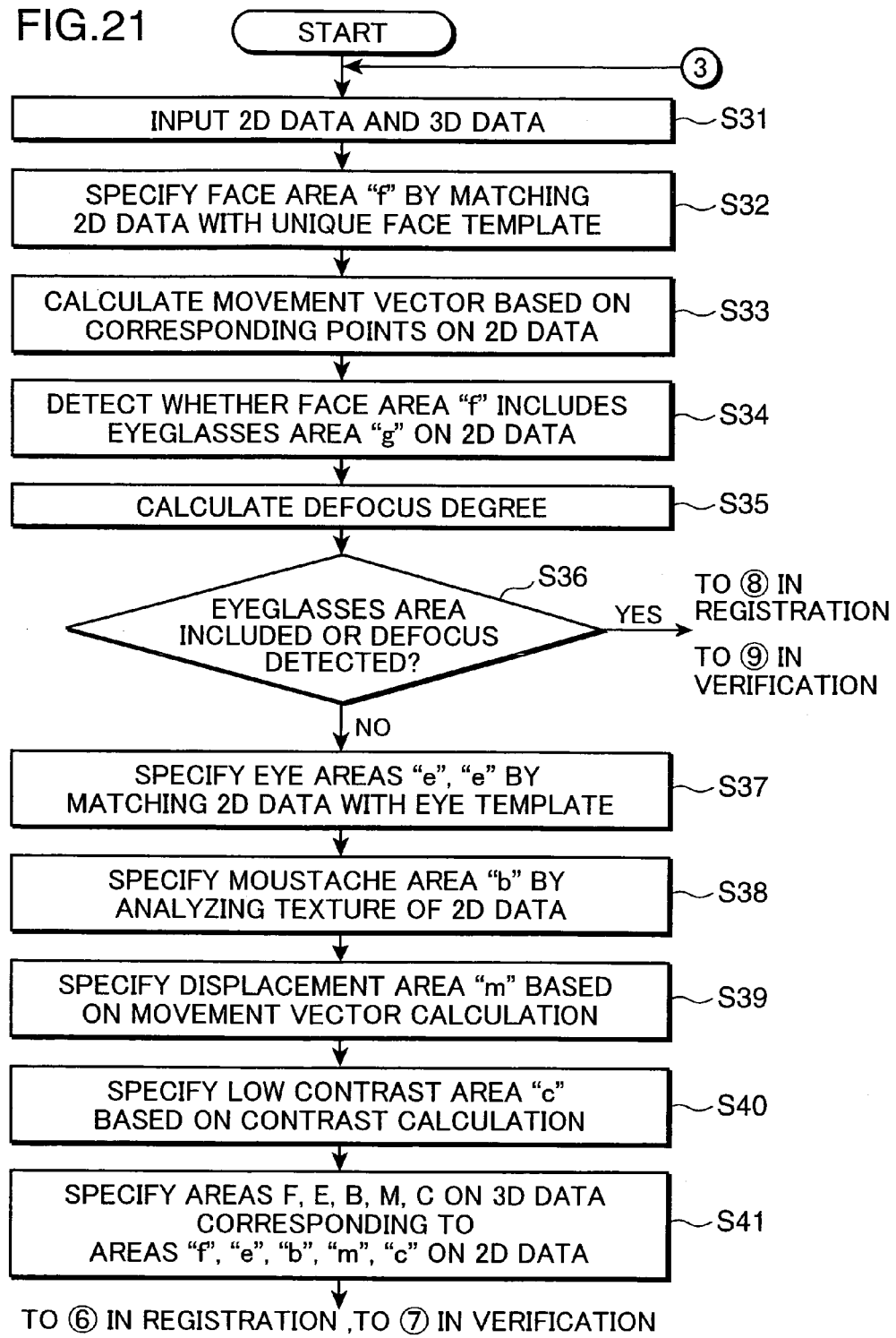

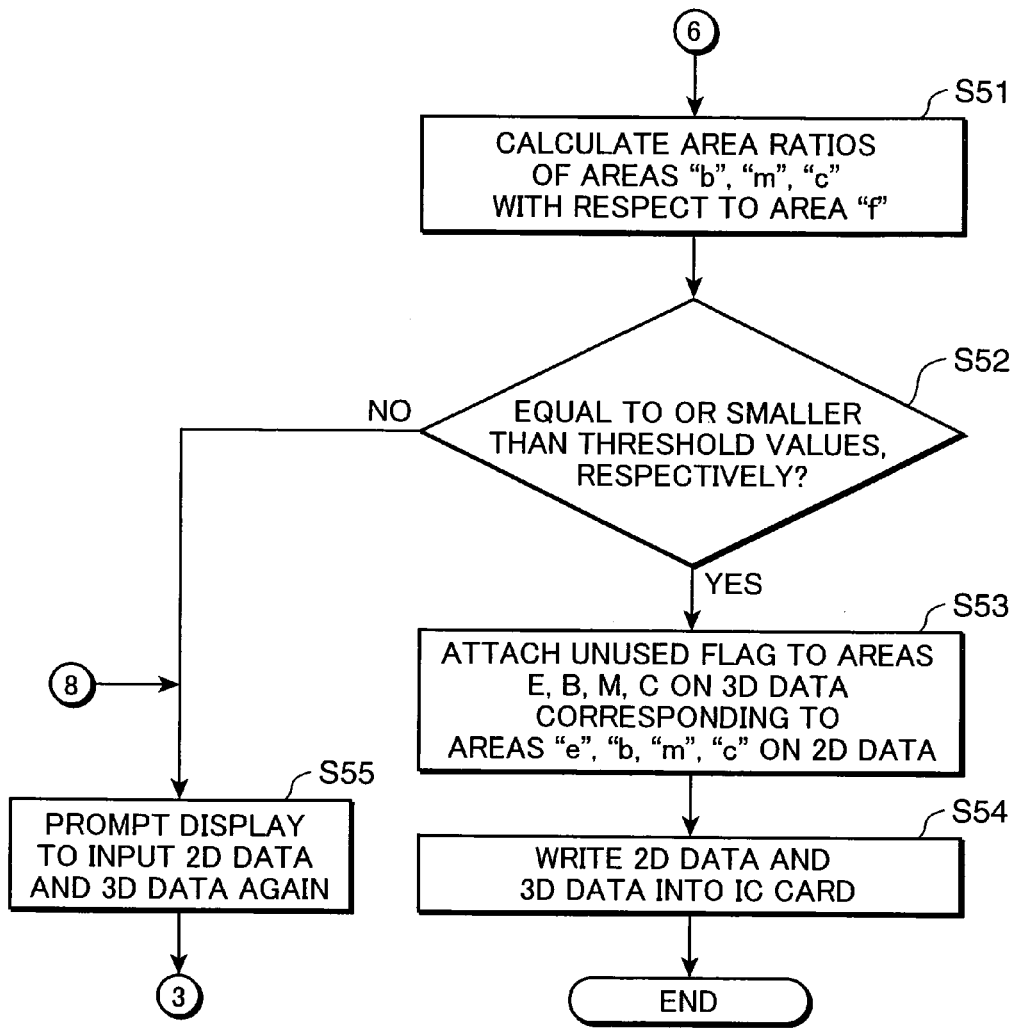

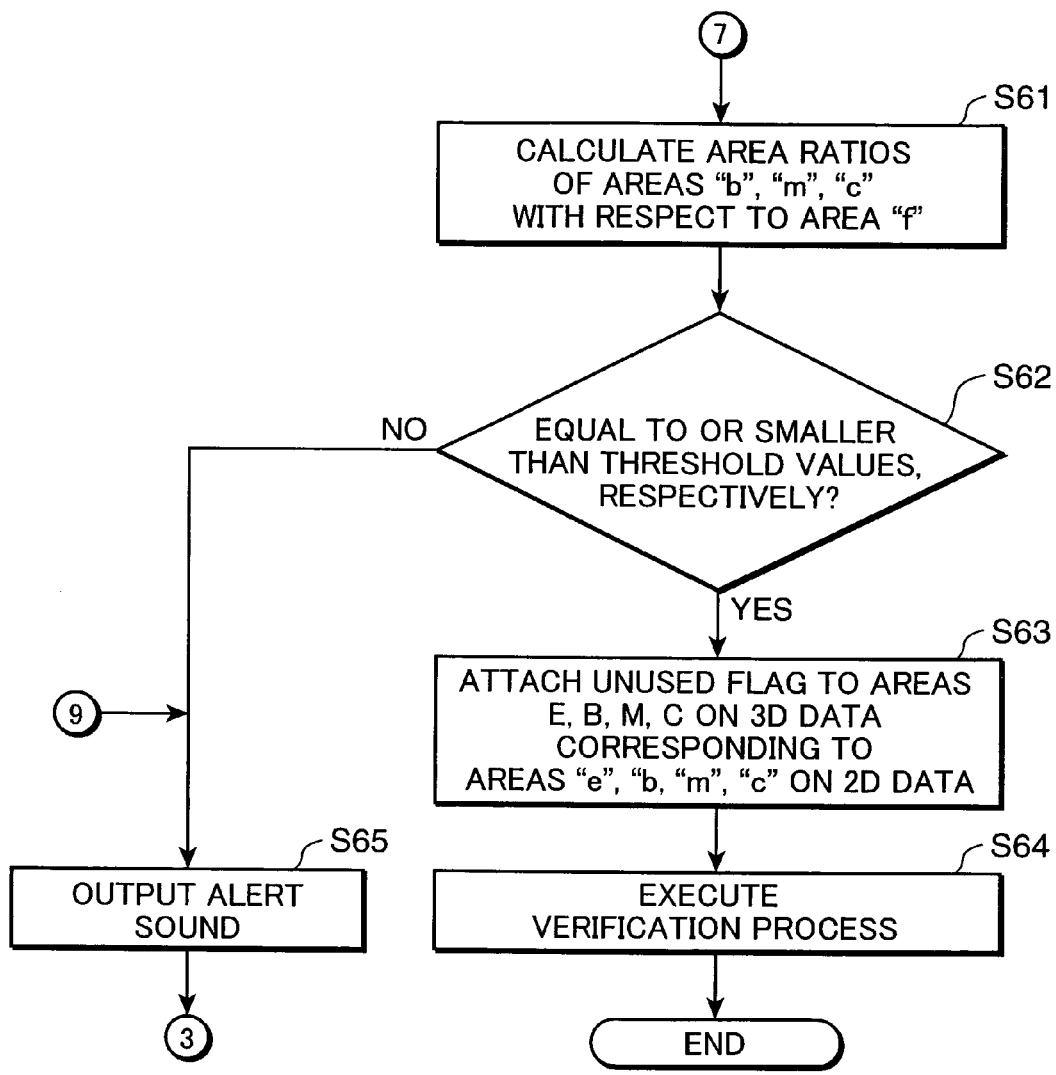

FACE AUTHENTICATION SYSTEM AND FACE AUTHENTICATION METHOD

This application is based on Japanese Patent Application No. 2007-10487 filed on Jan. 19, 2007, the contents of which are hereby incorporated by reference.

BACKGROUND OF THE INVENTION

1. Field of the Invention

The present invention relates to a face authentication system and a face authentication method for performing a registration process and a verification process of authentication data based on three-dimensional data on a face area of a human.

2. Description of Related Art

Conventionally, there have been proposed various biometric methods, using two-dimensional image data on a face area of a human. For instance, there is known a biometric method comprising: acquiring a two-dimensional image including a face area of a person (hereinafter, also called as "subject") whose authentication is required; preregistering image information after specifying the face area by matching the acquired two-dimensional image with a predetermined face template; and comparing an image on the face area acquired in authentication with the registered image in feature quantity.

There is also proposed a biometric method for acquiring three-dimensional data on a face area in addition to two-dimensional image data, and performing personal authentication by referring to the two-dimensional image data and the three-dimensional data (see e.g. Japanese Unexamined Patent Publication No. 2003-162730). With use of the method, an authentication process can be performed in a state that the three-dimensional feature quantity on the face area is included. This enables to realize more accurate and efficient authentication. Generally, a non-contact optical three-dimensional shape measuring device is used to obtain three-dimensional data on the face area.

In optically acquiring three-dimensional data on a face area of a subject, it is highly likely that a part of the three-dimensional data may be missing depending on a face condition of the subject or a like factor. For instance, in the case where the subject wears eyeglasses, specular reflection may occur on the eye portions of the subject, which leads to a failure of receiving reflection light suitable for measurement. In a face area where the subject wears a moustache/beard, light scatters on the moustache/beard area because of a complicated surface configuration of the moustache/beard area. This may also lead to a failure of receiving reflection light suitable for measurement. In such a case, the quality of three-dimensional data may be degraded, with the result that authentication precision may be lowered. Also, a relatively long time is required to acquire three-dimensional data. The face of the subject may move during the data acquisition. This may also degrade the quality of three-dimensional data.

In view of the above, it is desirable to rate the quality of three-dimensional data acquired at the time of registering authentication data. The same idea is also applied to three-dimensional data to be acquired in verification. Heretofore, there has not been proposed a method for accurately rating the quality of three-dimensional data. For instance, the above publication discloses an approach of using eyeglasses or a moustache/beard as a targeted object for analysis in authentication. However, the publication merely discloses use of eyeglasses or a moustache/beard as a feature quantity, and does not disclose rating the quality of three-dimensional data.

SUMMARY OF THE INVENTION

In view of the above problems residing in the conventional art, it is an object of the present invention to provide a face authentication system and a face authentication method that enable to accurately rate the quality of three-dimensional data in registering or verifying the three-dimensional data.

A face authentication system according to an aspect of the invention includes a data processing section for performing a predetermined data processing operation; a first data input section for inputting three-dimensional data on a face area of a subject to the data processing section; and a second data input section for inputting two-dimensional image data on the face area of the subject to the data processing section, the two-dimensional image data corresponding to the three-dimensional data to be inputted to the data processing section, wherein the data processing section includes: a quality rating section for rating the quality of the three-dimensional data based on the two-dimensional image data, and generating quality data, and an authentication processing section for executing a registration process or a verification process of authentication data based on the three-dimensional data, if the quality data satisfies a predetermined requirement.

These and other objects, features and advantages of the present invention will become more apparent upon reading the following detailed description along with the accompanying drawing.

BRIEF DESCRIPTION OF THE DRAWINGS

FIGS. 11A and 11B are diagrams for describing an example of two-dimensional image data and three-dimensional image data of a subject wearing eyeglasses.

FIG. 21 is a flowchart showing an operation flow to be executed by the face authentication system in accordance with the second embodiment.

FIG. 22 is a flowchart showing an operation to be executed after Step S41 in FIG. 21 in registering authentication data.

FIG. 23 is a flowchart showing an operation to be executed after Step S41 in FIG. 21 in verifying authentication data.

DETAILED DESCRIPTION OF THE PREFERRED EMBODIMENTS

Figure 1:
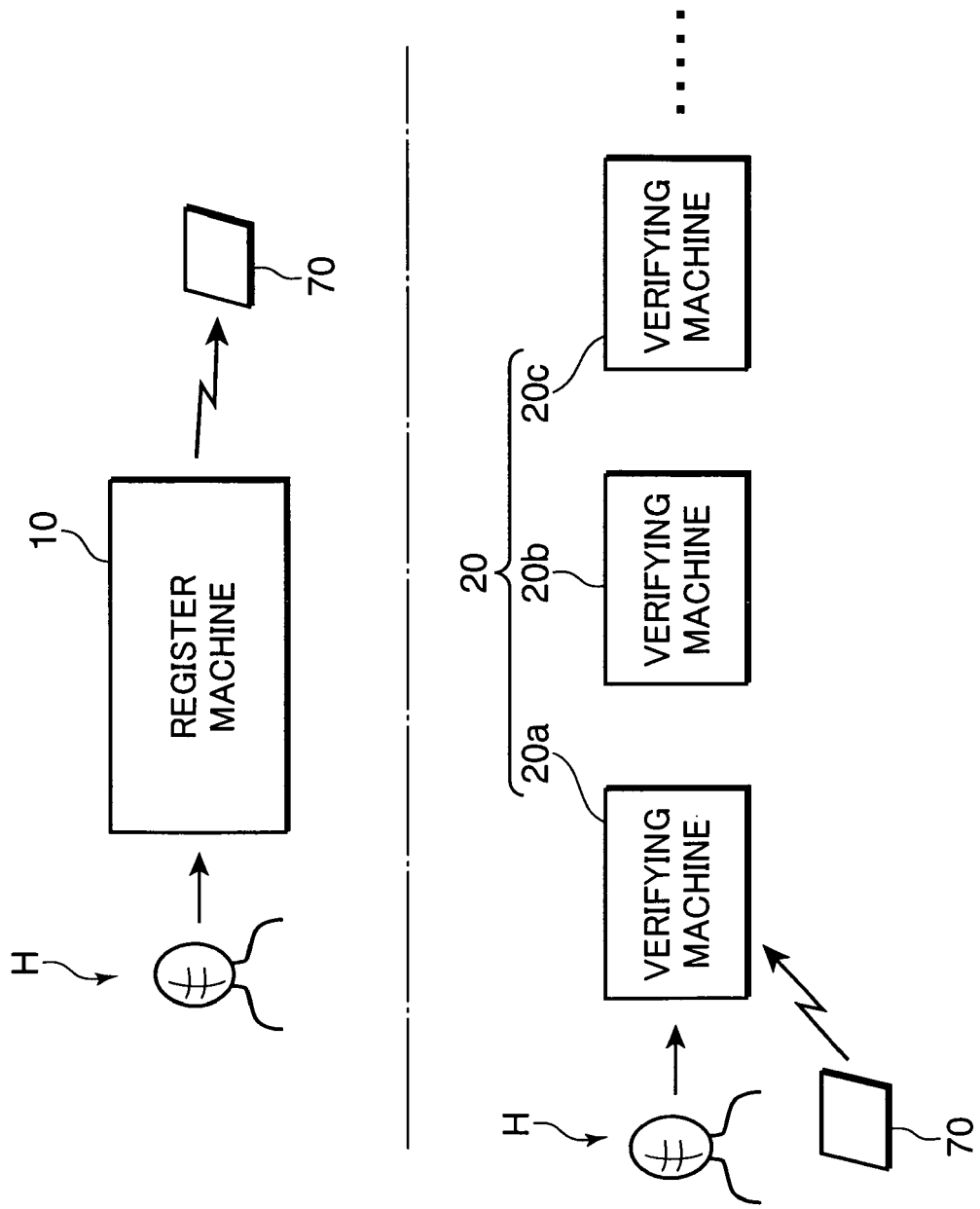
FIG. 1 is a block diagram showing a schematic arrangement of a face authentication system in accordance with a first embodiment of the invention.

In the following, embodiments of the invention are described in detail referring to the drawings.

First Embodiment

FIG. 1 is a block diagram showing a schematic arrangement of a face authentication system in accordance with a first embodiment of the invention. The face authentication system includes a register machine 10 for performing a process of writing i.e. registering authentication data of a subject H into an IC card 70, and a verifying machine group 20 i.e. verifying machines 20a, 20b, 20c, . . . for performing a process of verifying the subject H by reading the authentication data recorded in the IC card 70.

An example of using the face authentication system is as follows. The register machine 10 is installed in a core center such as an administration bureau, and the verifying machines 20a, 20b, 20c . . . , are individually installed in branch centers serving as access points. The subject H registers three-dimensional data on his or her face, as authentication data for authenticating the subject H, into the IC card 70, with use of the register machine 10 at the core center. The subject H is allowed to carry the registered IC card 70, and acquire access permission by performing a verification process with respect to one of the verifying machine group 20 installed in the branch center to which the subject H intends to access, using the IC card 70.

Figure 2:
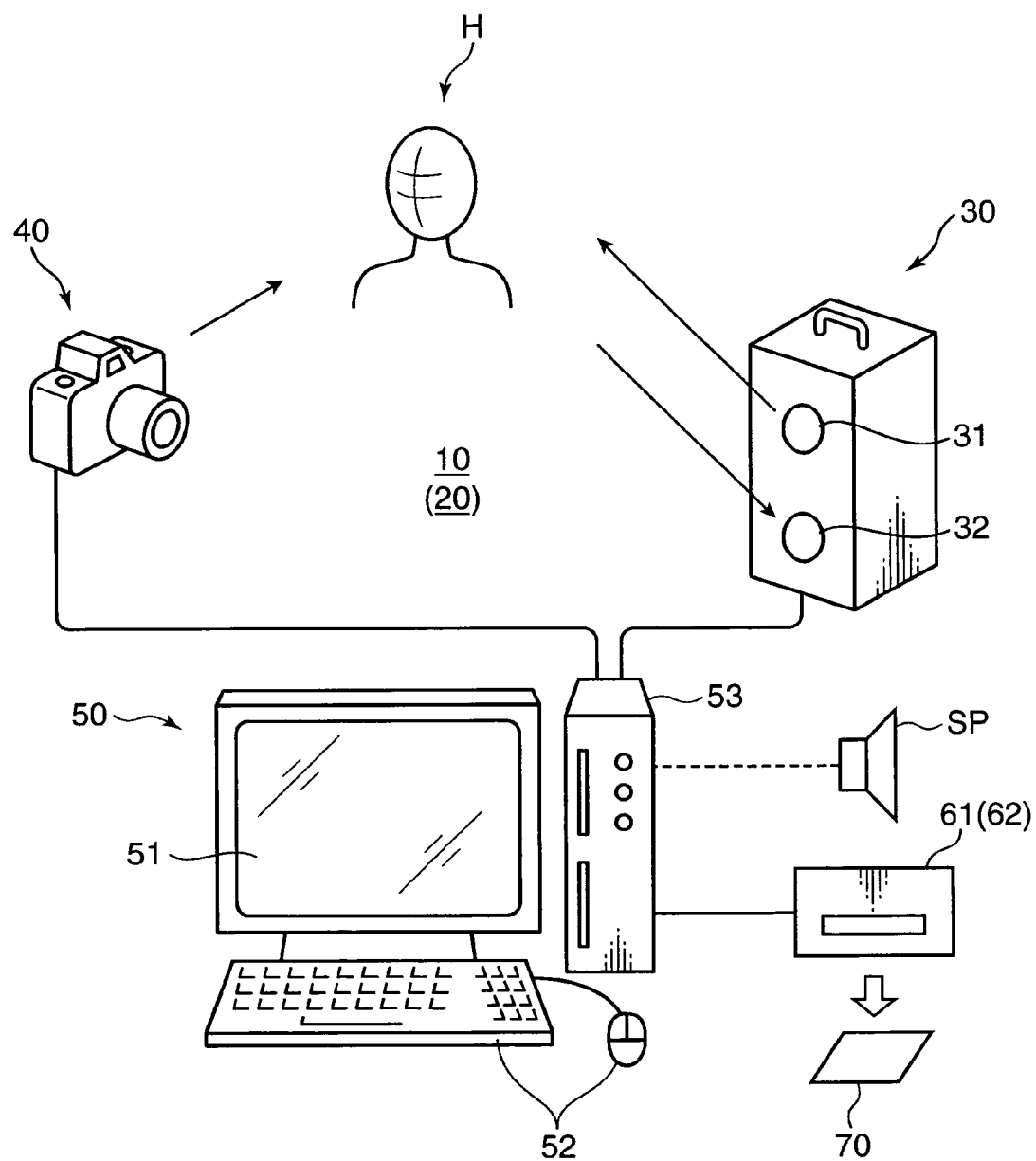
FIG. 2 is a diagram showing a hardware configuration of a register machine or a verifying machine of the face authentication system.

FIG. 2 is a diagram showing a hardware configuration of the register machine 10 or the verifying machine 20. The register machine 10 is adapted to acquire three-dimensional data and two-dimensional image data on the face of the subject H, and write authentication data of the subject H into the IC card 70. The register machine 10 includes a non-contact three-dimensional digitizer 30, as a first data input section, for inputting three-dimensional data on the face of the subject H, a digital camera 40, as a second data input section, for inputting two-dimensional image data, a personal computer 50, as a data processing section, for performing a predetermined registration process, and an IC card writer 61 for writing authentication data into the IC card 70.

The three-dimensional digitizer 30 is adapted to input three-dimensional data on a face area of the subject H, using a method called a light section method. The three-dimensional digitizer 30 has a substantially rectangular parallelepiped housing with a built-in optical unit provided with a light emitter and a light receiver. A light projector 31 formed with a light projecting window, and a light receiver 32 formed with a light receiving window are provided in the housing. The light projector 31 is disposed at an upper position away from the light receiver 32 by a predetermined distance, depending on a baseline length.

The light projector 31 emits a slit beam, which is a laser beam irradiated in a horizontal direction. The slit beam is a planar beam which is irradiated with a predetermined radiation angle in the horizontal direction i.e. with a fan-like shape, and has a certain width in a vertical direction. The slit beam is projected toward the face of the subject H in such a manner that a part of the slit beam reflected on the subject's face is incident onto the light receiver 32. The three-dimensional digitizer 30 calculates a distance to a reflection point on the face area of the subject H by triangulation, based on a projection angle of the laser beam, a receiving angle of the reflection beam, and a baseline length between a light projecting point and a light receiving point. Three-dimensional data on the face area of the subject H is acquired at multiple points of a grid pattern, based on the distance information.

The digital camera 40 includes an imaging optical system for forming a subject light image, and an image sensor for photoelectrically converting the subject light image into an image signal. The digital camera 40 is adapted to input two-dimensional image data on the face area of the subject H. The two-dimensional image data and the three-dimensional data are acquired substantially at the same timing. Specifically, an operation of measuring three-dimensional data by the three-dimensional digitizer 30, and an imaging operation by the digital camera 40 are performed in synchronism with each other. The synchronous operation is performed to rate the quality of the three-dimensional data based on the two-dimensional image data. Two consecutive two-dimensional image data are acquired to specify a displacement area i.e. calculate a movement vector, which will be described later.

The personal computer 50 executes various computations for performing a predetermined registration process with respect to the subject H, by reading three-dimensional shape measurement data acquired by the three-dimensional digitizer 30, and image data acquired by the digital camera 40. The personal computer 50 includes a display section 51 provided with a liquid crystal display, an operation section 52 provided with a keyboard and a mouse, and a main body 53 provided with a hard disk device.

The construction of the verifying machine 20 is substantially the same as that of the register machine 10 except for the following. Specifically, the verifying machine 20 is provided with an IC card reader 62 for reading the authentication data recorded in the IC card 70, in place of the IC card writer 61. The personal computer 50 is operative to perform a predetermined verification process. The primary parts of the process contents to be executed by the verifying machine 20 are substantially the same as those to be executed by the register machine 10. The verifying machine 20 includes a speaker SP for generating a beep sound for alerting the subject H of authentication failure.

Figure 3:
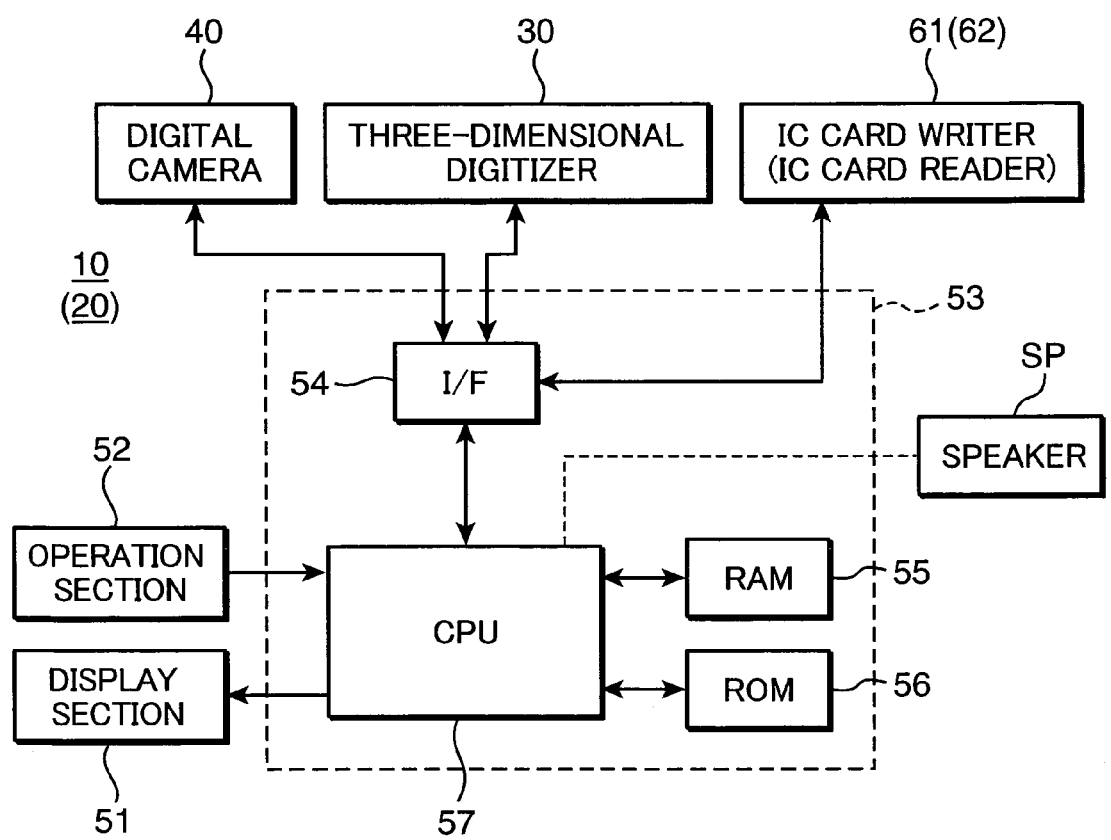
FIG. 3 is a block diagram showing a schematic arrangement of a main body of a personal computer to be used in the face authentication system.

FIG. 3 is a block diagram showing a schematic arrangement of the main body 53 of the personal computer 50. In order to acquire three-dimensional data and two-dimensional image data on the face area of the subject H, the computer main body 53 has an interface 54 for enabling data communication with the three-dimensional digitizer 30 and the digital camera 40, an RAM (Random Access Memory) 55 for temporarily storing the three-dimensional data, the two-dimensional image data, and various data for a computation process or a control process, an ROM (Read Only Memory) 56 for storing various control programs and the like, and a CPU (Central Processing Unit) 57 for controlling various operations of the components of the personal computer 50.

Figure 4:
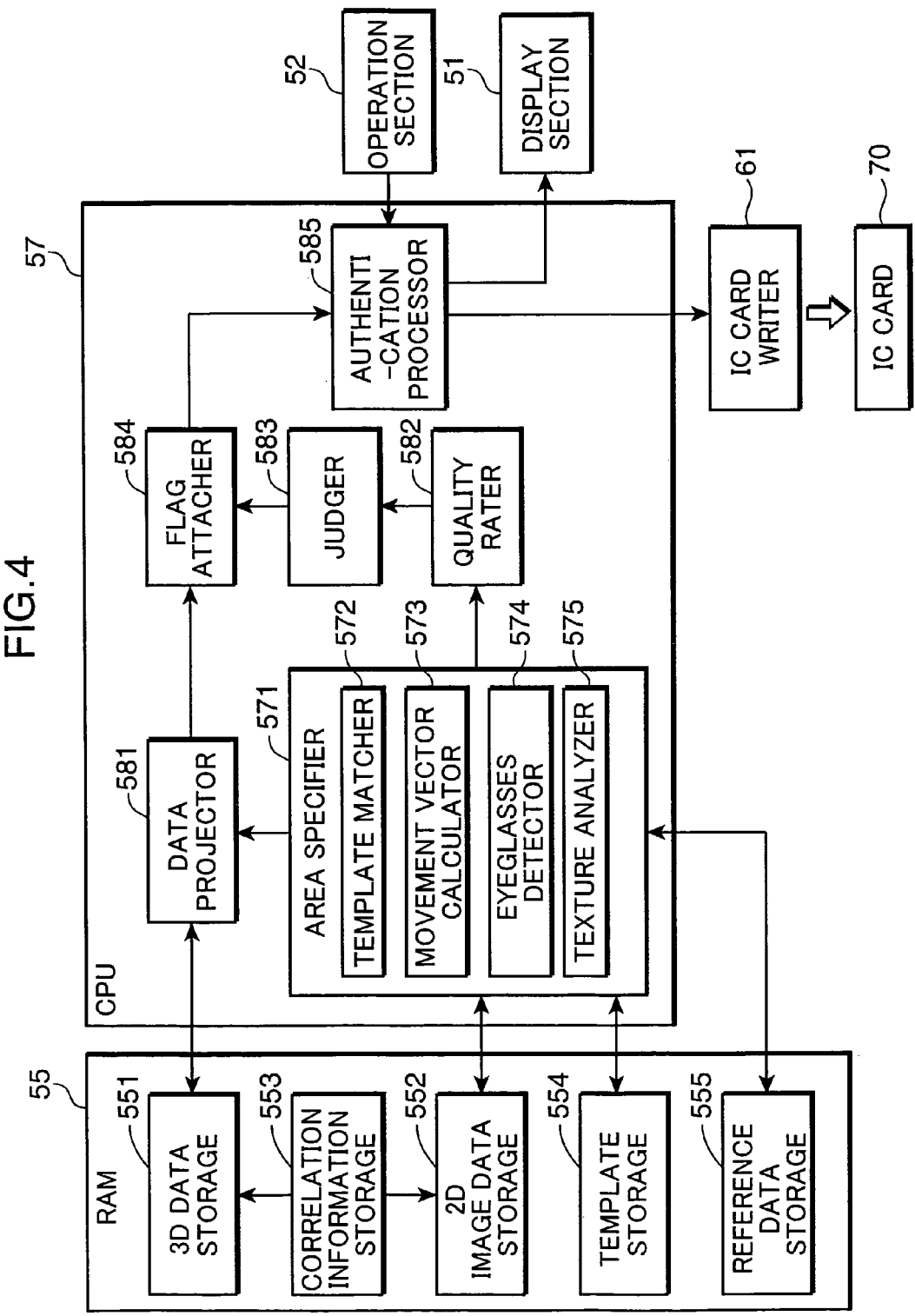
FIG. 4 is a functional block diagram showing a functional arrangement of a CPU of the register machine.

FIG. 4 is a functional block diagram showing a functional arrangement of the CPU 57 of the register machine 10 in correlation with the data to be temporarily stored in the RAM 55. By executing the control program stored in the ROM 56, the CPU 57 is operative to function as an area specifier 571, a data projector 581 as a data projecting section, a quality rater 582 as a quality rating section, a judger 583 as a judging section, and a flag attacher 584 and an authentication processor 585 as an authentication processing section.

Figure 5:
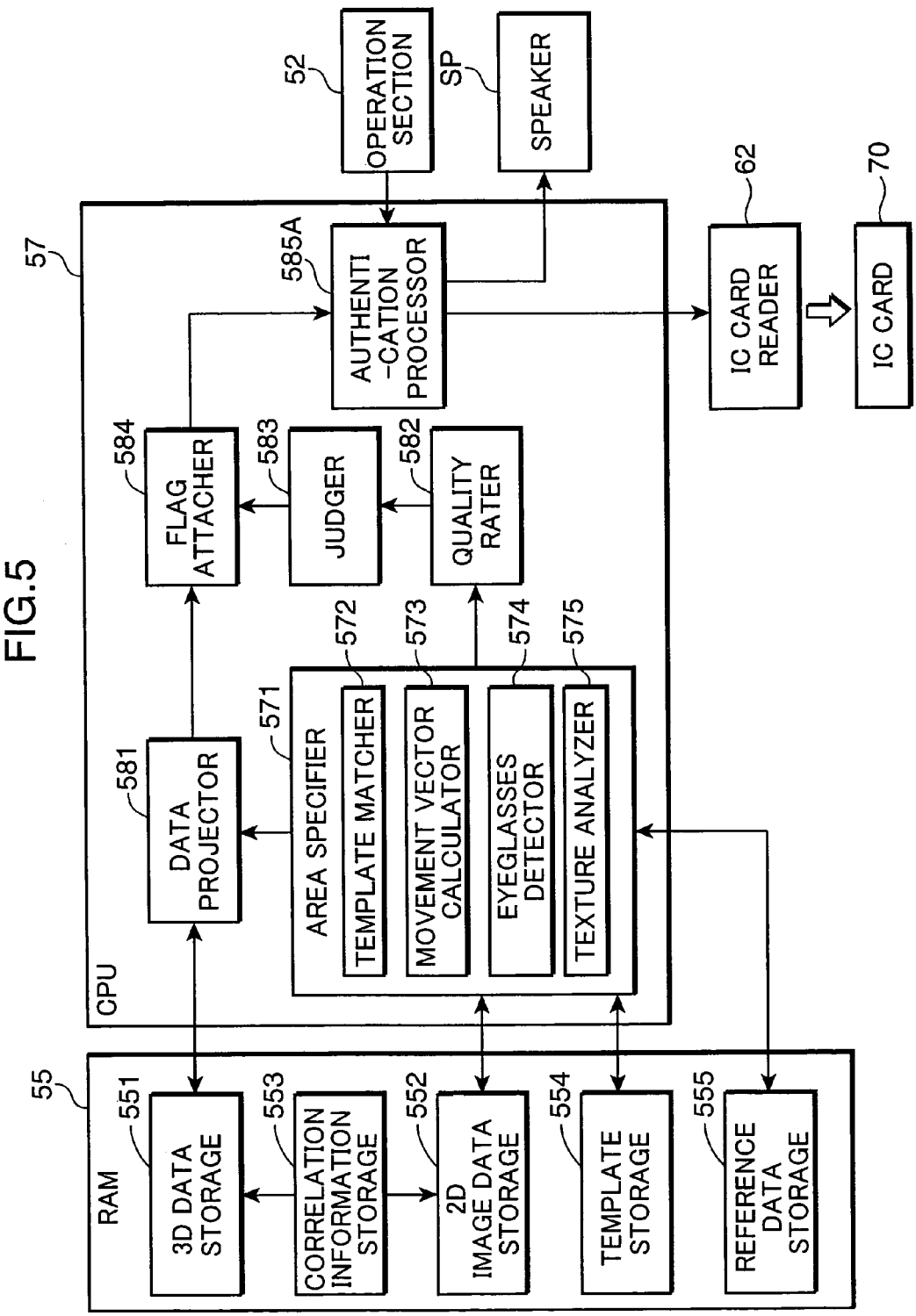
FIG. 5 is a functional block diagram showing a functional arrangement of a CPU of the verifying machine.

FIG. 5 is a functional block diagram showing a functional arrangement of the CPU 57 of the verifying machine 20 in correlation with the data to be temporarily stored in the RAM 55. The CPU 57 of the verifying machine 20 has the functional parts substantially identical to those of the register machine 10 except that the CPU 57 of the verifying machine 20 has an authentication processor 585A which is also operative to perform a verification process for authentication. In the following, description is made based on a premise that the functional parts of the register machine 10 and the functional parts of the verifying machine 20 are common to each other except for the authentication processors 585 and 585A.

The RAM 55 includes a three-dimensional data storage 551 for storing three-dimensional data composed of a group of three-dimensional points arranged in e.g. a grid pattern, which is created based on three-dimensional shape measurement data including a face portion of the subject H to be inputted from the three-dimensional digitizer 30; a two-dimensional image data storage 552 for storing two-dimensional image data including the face portion of the subject H to be inputted from the digital camera 40; and a correlation information storage 553 for storing correlation information to be used in correlating positions between the three-dimensional data and the two-dimensional image data. The RAM 55 also includes a template storage 554 for storing a unique face template and an eye template, which will be described later, and a reference data storage 555 to be used in judging whether a targeted face portion of the subject H includes an eyeglasses area.

Figure 6A:
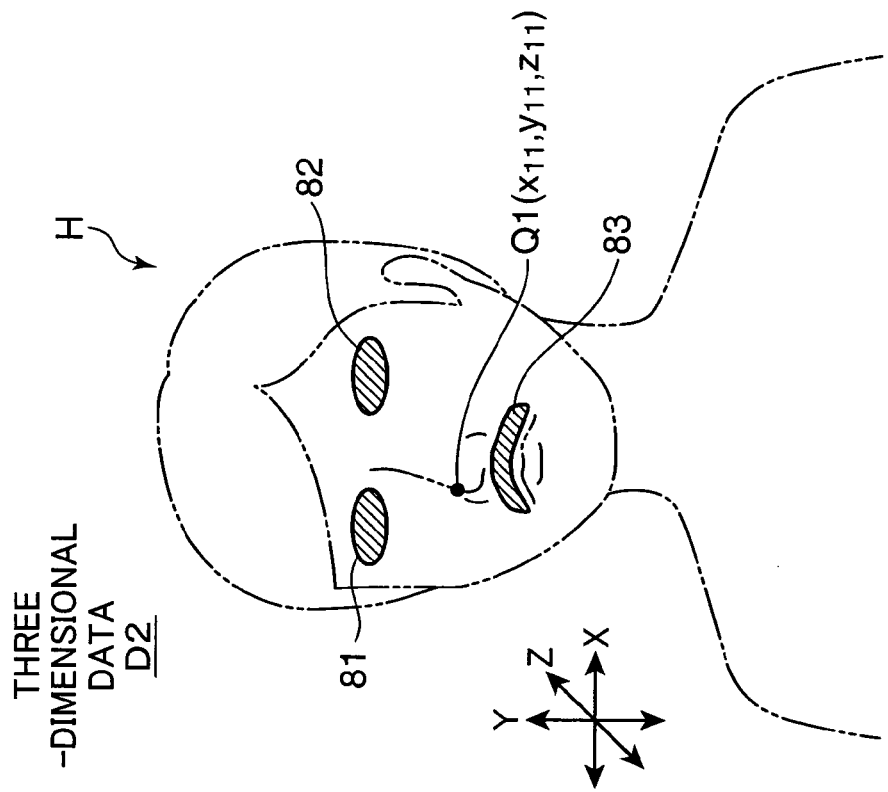
FIGS. 6A and 6B are diagrams for describing an example of two-dimensional image data and three-dimensional data concerning a subject whose authentication is required.
Figure 6B:
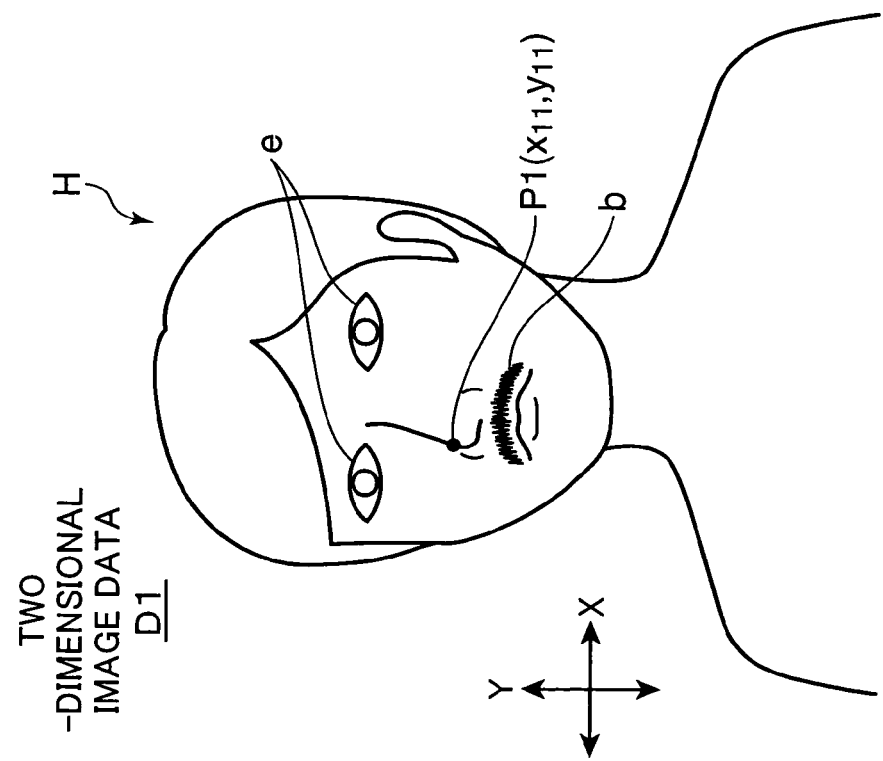

FIGS. 6A and 6B are diagrams for describing an example of two-dimensional image data D1 and three-dimensional data D2 concerning a subject H, which are temporarily stored in the two-dimensional image data storage 552 and the three-dimensional data storage 551, respectively. In the embodiment, an example is described, wherein the subject H wears a moustache on a site illustrated as a moustache area "b" in FIG. 6A.

An image coordinate P (x, y) of the two-dimensional image data D1, and a three-dimensional coordinate Q (x, y, z) at a three-dimensional point of the three-dimensional data D2 are correlated to each other by a pre-calibrated projection matrix having identical dimensions. For instance, an image coordinate $P_1$ $(x_{11}, y_{11})$ of the two-dimensional image data D1 indicating a nose head of the subject H shown in FIG. 6A, and a three-dimensional coordinate $Q_1$ $(x_{11}, y_{11}, z_{11})$ of the three-dimensional data D2 indicating the nose head shown in FIG. 6B are correlated to each other, and positional correlations are defined between the image coordinate $P_1$ and the three-dimensional coordinate $Q_1$. The correlation information stored in the correlation information storage 553 is the data relating to the positional correlations.

The area specifier 571 performs a process of specifying various areas concerning the subject H on the two-dimensional image data D1 to rate the quality of the three-dimensional data D2. The areas to be specified are sites that may affect the quality of the three-dimensional data D2. In this embodiment, the area specifying process is performed in such a manner that after a face area and eye areas of the subject H are specified, an area where data displacement is large at the time of acquiring the two-dimensional image data D1 or the three-dimensional data D2 and/or a moustache/beard area is specified, and judgment is made as to whether the face area includes an eyeglasses area.

Generally, specular reflection occurs on eye areas of the subject in the case where the three-dimensional digitizer 30 for measuring a three-dimensional shape of an object by projecting a slit beam is used. Accordingly, the three-dimensional digitizer 30 may fail to receive reflection light suitable for measurement from the eye areas. In addition to this, light scatters on the moustache/beard area because of a complicated surface configuration of the moustache/beard area. Accordingly, the three-dimensional digitizer 30 may also fail to receive reflection light suitable for measurement from the moustache/beard area. In view of this, as shown in FIG. 6B, it is desirable not to use areas 81 and 82 corresponding to eye areas "e" and "e", and an area 83 corresponding to the moustache area "b" on the three-dimensional data D2 in order to enhance authentication precision. In the case where the face of the subject moves or the lips of the subject move during measurement by the three-dimensional digitizer 30, the three-dimensional digitizer 30 also may fail to receive accurate reflection light in accordance with the surface configuration of the face area of the subject.

In view of the above, the area specifier 571 performs a process of specifying these areas. The area specifier 571 does not perform the area specifying process directly on the three-dimensional data D2, but performs the area specifying process on the two-dimensional image data D1 which has been acquired in synchronism with the three-dimensional data D2 for the following reasons. A complex computation is necessary to specify the areas such as the eye areas or the moustache area on the three-dimensional data D2. Also, specifying a displacement area itself on the three-dimensional data D2 is difficult. On the other hand, the area specifying process on the two-dimensional image data D1 can be executed with use of a relatively simple computation method as exemplified in the following.

The area specifier 571 functionally includes a template matcher 572, a movement vector calculator 573, an eyeglasses detector 574, and a texture analyzer 575.

Figure 7:
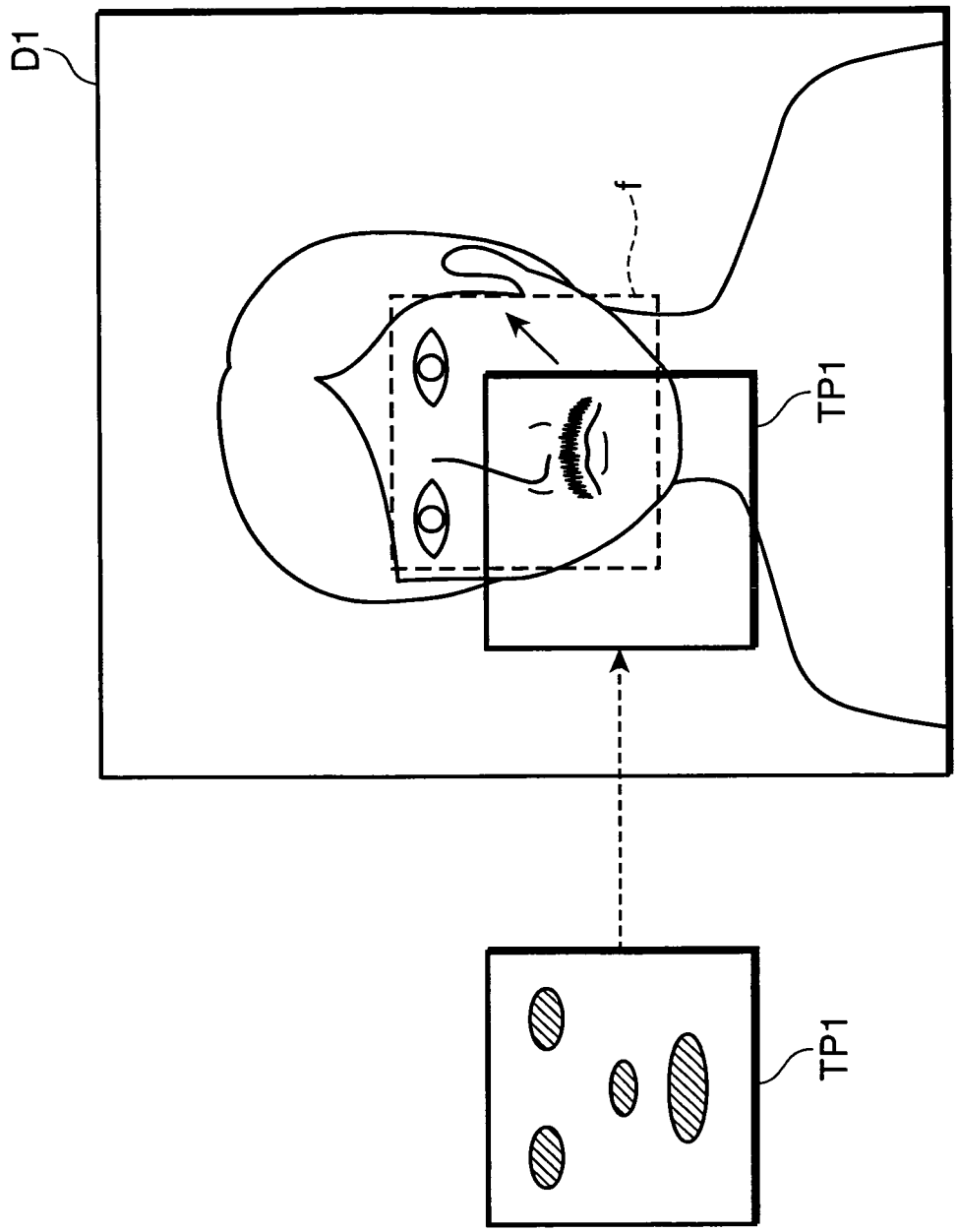
FIG. 7 is a diagram schematically showing a process of specifying a face area serving as an authenticating part, based on a two-dimensional image.

The template matcher 572 performs a process of specifying a face area "f" as an authenticating part, based on a two-dimensional image of the subject H as shown in FIG. 6A. FIG. 7 is a diagram schematically showing the process of specifying the face area, wherein a process of matching the two-dimensional image data D1 acquired by the manner as shown in FIG. 6A with a unique face template TP1 is executed. Specifically, a degree of matching with the unique face template TP1 is verified by sliding and positioning the unique face template TP1 relative to the two-dimensional image of the subject H. The area where the unique face template TP1 overlaps the face image of the subject H at a position with a highest matching degree is specified as the face area "f" of the subject H.

The unique face template TP1 is a rectangular template having dimensions capable of covering the eyes, the nose, and the mouth of the subject H. The unique face template TP1 is a template, in which the position, the shape, and a like characterizing element of the eyes, the nose, the mouth, and a like facial component of a human are specified, based on information acquired from multitudes of persons. The information relating to the unique face template TP1 is stored in advance in the template storage 554 of the RAM 55. The template matcher 572 performs a process of reading out the unique face template TP1 from the template storage 554, and matching the readout unique face template TP1 with the two-dimensional image data D1. By specifying the face area "f" of the subject H in the aforementioned manner, the hair portion of the subject H which is an improper element for authentication is removed.

Figure 8:
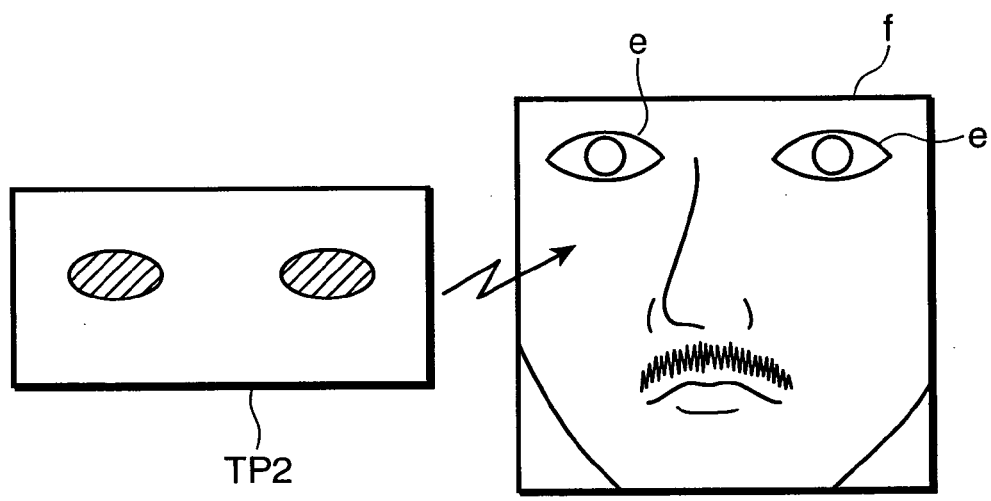
FIG. 8 is a diagram schematically showing a process of specifying eye areas from a face area.

The template matcher 572 also performs a process of specifying the areas corresponding to the eyes "e" and "e" of the subject H with respect to the face area "f" which has been specified based on the two-dimensional image. FIG. 8 is a diagram schematically showing the process of specifying the eye areas. Similarly to the above, the template matcher 572 performs a process of matching the two-dimensional image on the face area "f" with an eye template TP2 to specify the area where the eye template TP2 overlaps the face area "f" at a position with a highest matching degree, as the eye areas "e" and "e" of the subject H. The template matcher 572 performs a process of reading the eye template TP2 from the template storage 554, and matching the readout eye template TP2 with the two-dimensional image data concerning the face area "f".

Figure 9A:
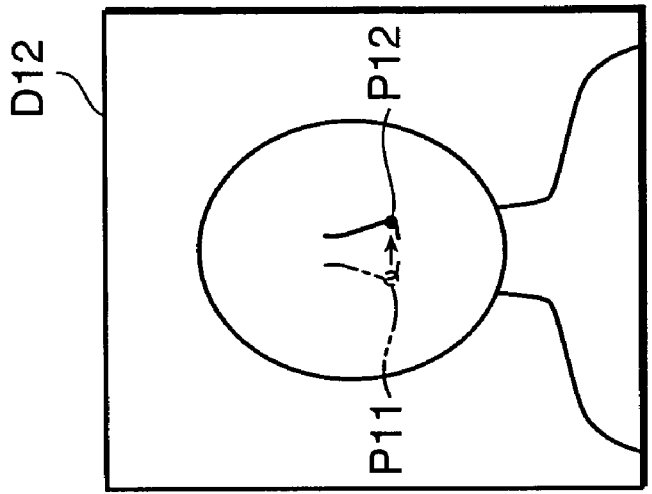
FIGS. 9A and 9B are diagrams schematically showing a process of calculating a movement vector based on corresponding points on two-dimensional images.
Figure 9B:
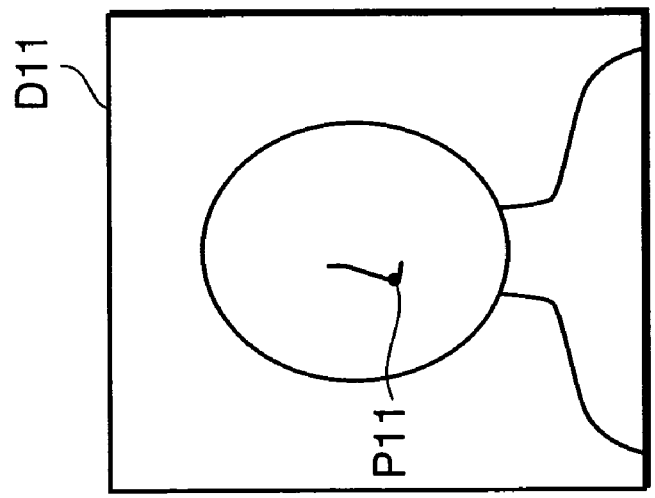

The movement vector calculator 573 performs a process of reading, from the two-dimensional image data storage 552, two frames of two-dimensional image data acquired by consecutively capturing a face image of the subject H by the digital camera 40, and calculating a movement vector based on corresponding points on the two frames of two-dimensional image data to specify a displacement area. FIGS. 9A and 9B are diagrams schematically showing the process to be executed by the movement vector calculator 573.

As shown in FIG. 9A, let it be assumed that an image coordinate P11 at a nose head of the subject H on two-dimensional image data D11 which has been acquired at the point of time t11 is specified by an edge process or a like process. Then, as shown in FIG. 9B, let it be assumed that a nose head specified on two-dimensional image data D12 which has been acquired at the point of time t12 slightly later than the point of time t11 is represented by an image coordinate P12. Then, the movement vector calculator 573 calculates a degree of displacement between the corresponding points on the two images by calculating a movement vector between the image coordinate P11 and the image coordinate P12, and specifies an area where the movement vector is larger than a threshold value, as a displacement area "m".

Figure 10:
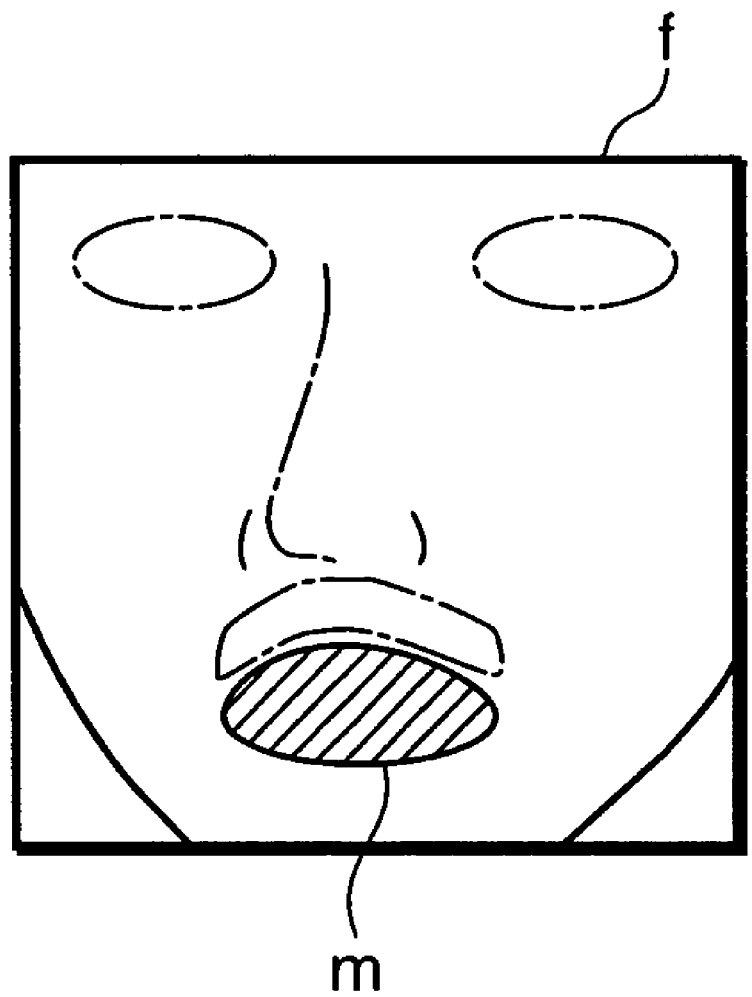
FIG. 10 is a diagram schematically showing a process of specifying a displacement area from a face area.

FIG. 10 is a diagram schematically showing a state that the displacement area "m" is specified with respect to an image of the face area "f". In this embodiment, there is described an example that the lips move during measurement of the three-dimensional data D2 i.e. obtaining two-dimensional image data on two consecutive images, with the result that an area around the lips is specified as the displacement area "m".

The eyeglasses detector 574 detects whether the two-dimensional image data D1 includes an eyeglasses area. FIGS. 11A and 11B are diagrams for describing two-dimensional image data D1' and three-dimensional data D2' which have been acquired from a subject H' wearing eyeglasses. In this case, an area 84 on the three-dimensional data D2' corresponding to an eyeglasses area "g" on the two-dimensional image data D1' is relatively large with respect to the entirety of the three-dimensional data D2'. If authentication is performed based on the three-dimensional data D2' including the area 84 having a relatively large area ratio, authentication precision may be lowered. In view of this, in this embodiment, a judger 583 to be described later is operative to judge that a registration process and a verification process are not executed, if it is judged that the two-dimensional image data D1' includes the eyeglasses area "g". The eyeglasses detector 574 detects whether the two-dimensional image data D1 includes the eyeglasses area "g" to provide information for the judgment.

Specifically, the eyeglasses detector 574 detects whether the face area "f" includes the eyeglasses area "g", based on a pattern learning method using a multitude of sample image groups. The reference data storage 555 of the RAM 55 stores therein reference data on feature quantity derived from a multitude of sample images that individuals wear eyeglasses, and a multitude of sample images that the individuals do not wear eyeglasses to distinguish the former from the latter. The eyeglasses detector 574 detects whether the face area "f" includes the eyeglasses area "g" by matching the reference data with the acquired two-dimensional image data D1.

Figure 12:
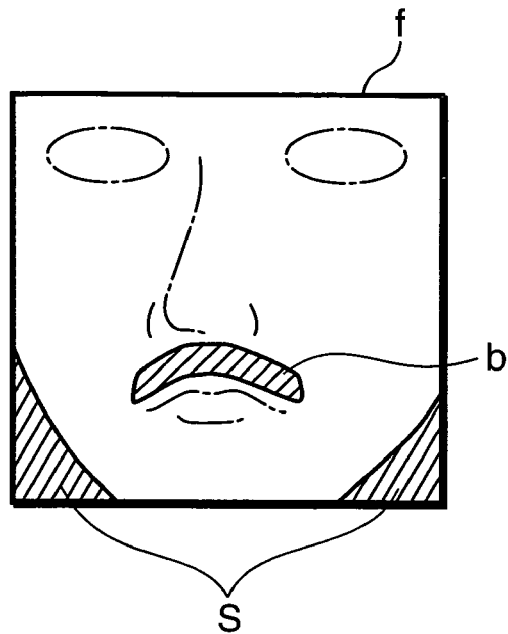
FIG. 12 is a diagram schematically showing a state that a moustache area and an out-of-face-contour area are specified with respect to an image of a face area.

The texture analyzer 575 performs texture analysis with respect to the two-dimensional image data on the face area "f" primarily for identifying the moustache area "b". For instance, the texture analyzer 575 performs texture analysis such as Gabor filter energy or luminance co-occurrence matrix, and specifies a pixel area where the parameter of the obtained texture feature quantity is equal to or smaller than a predetermined value, as the moustache area "b". Also, in the case where it is judged that the two-dimensional image data on the face area "f" includes an out-of-face-contour area "S" corresponding to a portion other than the face area "f", based on the texture feature quantity, the texture analyzer 575 also specifies the out-of-face-contour area "S" with respect to the face area "f". FIG. 12 is a diagram schematically showing a state that the moustache area "b", and the out-of-face-contour area "S" are specified with respect to the image of the face area "f".

Figure 13:
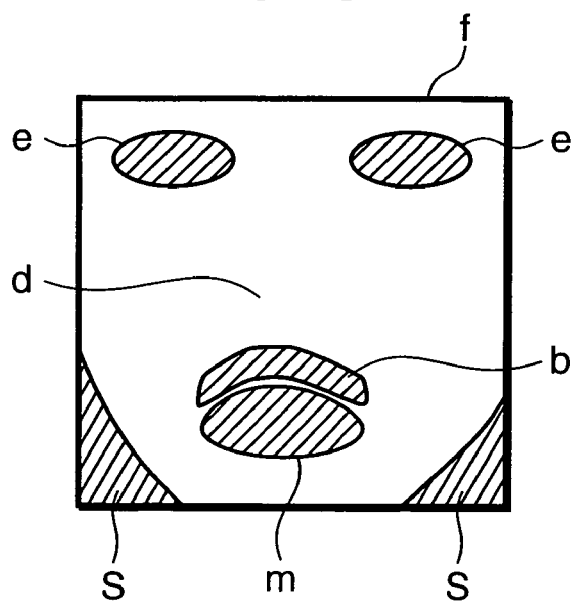
FIG. 13 is a diagram schematically showing a state that the respective areas in the face area are specified.

The area specifier 571 specifies the face area "f"; and the eye areas "e" and "e", the moustache area "b", and the displacement area "m" within the face area "f" on the two-dimensional image data D1 by specifying the respective areas as described above. FIG. 13 is a diagram schematically showing a state that these areas are specified. The eye areas "e" and "e", the moustache area "b", and the displacement area "m" are sites that are not suitable for an authentication process. A judging area "d" to be used in performing the authentication process is specified by removing the eye areas "e" and "e", the moustache area "b", and the displacement area "m" from the face area "f".

The data projector 581 performs a process of projecting the eye areas "e" and "e", the moustache area "b", and the displacement area "m", which have been specified on the two-dimensional image data D1 as local areas by the area specifier 571, onto corresponding areas i.e. local areas on the three-dimensional data D2. Specifically, the data projector 581 performs a process of transforming a three-dimensional coordinate value at an effective grid point on the three-dimensional data D2 i.e. a point where measurement was impossible because of low reflection, occlusion, or a like factor, other than the measured points, into a pixel coordinate value of the face area "f", the eye areas "e" and "e", the moustache area "b", and the displacement area "m" on the two-dimensional image data D1, using a predetermined coordinate transformation matrix. By performing the coordinate transformation, a face area F, eye areas E and E, a moustache area B, and a displacement area M are specified on the three-dimensional data D2.

The quality rater 582 generates quality data by estimatively rating the quality of the three-dimensional data D2, based on the two-dimensional image data D1 where the respective areas are specified as described above. The quality rater 582 generates the following quality data in this embodiment.

(a) first quality data indicating whether the face area "f" includes the eyeglasses area "g", based on an output from the eyeglasses detector 574;

(b) second quality data indicating the area ratio of the moustache area "b" with respect to the face area "f", based on an output from the texture analyzer 575; and (c) third quality data indicating the area ratio of the displacement area "m" with respect to the face area "f", based on an output from the movement vector calculator 573.

The judger 583 judges whether a registration process or a verification process is to be executed by the authentication processor 585 or 585A, based on the first through the third quality data. In the case where the first quality data indicates that the face area "f" includes the eyeglasses area "g", the judger 583 judges that a registration process is not to be executed, as described above. In the case where the second quality data indicates that the area ratio of the moustache area "b" is larger than a predetermined threshold value, precise authentication is less feasible or infeasible. Accordingly, the judgment result indicates that no registration process is not to be executed. In the case where the third quality data indicates that the area ratio of the displacement area "m" is larger than a predetermined threshold value, precise authentication is less feasible or infeasible for the similar reason as described above. Accordingly, the judgment result indicates that no registration process is to be executed. The judger 583 judges that a registration process is to be executed, if the judgment result indicates conditions other than the above. Since it is conceived that all the possible subjects H have the eye areas "e" and "e", the eye areas "e" and "e" are not used as an object for quality rating.

If the judgment result indicates that a registration process is to be executed, the flag attacher 584 as a determining section attaches an unused flag i.e. an invalid flag to three-dimensional data having a coordinate point within the eye areas E and E, the moustache area B, and the displacement area M on the three-dimensional data D2 specified by the data projector 581; and attaches a use flag i.e. a valid flag to three-dimensional data having a coordinate point within the face area F other than the eye areas E and E, the moustache area B, and the displacement area M.

The coordinate points, where measurement by the three-dimensional digitizer 30 was impossible because of low reflection, occlusion, or a like factor, are stored in the three-dimensional data storage 551 in a state that an invalid flag is attached to the three-dimensional data D2. Accordingly, the flag attacher 584 does not attach an unused flag to the coordinate points where measurement by the three-dimensional digitizer 30 was impossible. By performing the aforementioned flag attaching process, three-dimensional data D2 for which a registration process or a verification process is allowed is restricted.

The authentication processor 585 performs overall control of causing the respective functional parts in the CPU 57 to execute the aforementioned operations in response to an operation signal inputted from the user through the operation section 52. Then, in use of the register machine 10, if the judger 583 judges that the registration process is to be executed, the authentication processor 585 issues a control signal to the IC card writer 61 to cause the IC card writer 61 to write authentication data into the IC card 70. Upon receiving the control signal, the IC card writer 61 writes, into the IC card 70, templates of the two-dimensional image data D1 and the three-dimensional data D2 concerning the subject H in a predetermined format.

If, on the other hand, the judger 583 judges that the registration process is not to be executed, the authentication processor 585 generates a notification signal of notifying the user that the registration process is not executed. The notification signal is displayed on the display section 51, as a message e.g. "Please input the face image again". In this condition, the three-dimensional data and two-dimensional image data that have been currently inputted from the three-dimensional digitizer 30 and the digital camera 40 for registration are restrained from being written into the IC card 70.

In use of the verifying machine 20, if the judger 583 judges that a verification process is to be executed, the authentication processor 585A issues a control signal to the IC card reader 62 to cause the IC card reader 62 to read the authentication data from the IC card 70. Then, the authentication processor 585A executes a process of matching the three-dimensional data and the two-dimensional image data which have been currently inputted from the three-dimensional digitizer 30 and the digital camera 40 for verification, with the templates of the three-dimensional data and the two-dimensional image data recorded in the IC card 70. The verification process may include e.g. an approach of matching a three-dimensional image and a two-dimensional image with unique face parameters, respectively, using multimodal verification (e.g. multimodal verification disclosed in Kevin W. Bowyer, Kyong Chang and Patrick Flynn, An Evaluation of Multimodal 2D+3D face Biometrics, IEEE Trans. on Pattern Analysis and Machine Intelligence, 27(4):619-624, April 2005).

If, on the other hand, the judger 583 judges that the registration process is not to be executed, the authentication processor 585A generates a notification signal of notifying the user that the verification process is not executed. The notification signal is converted into e.g. an audio signal, and a beep sound of prompting the user to input a face image again is outputted from the speaker SP. In this case, an authentication process is not executed.

Figure 14:
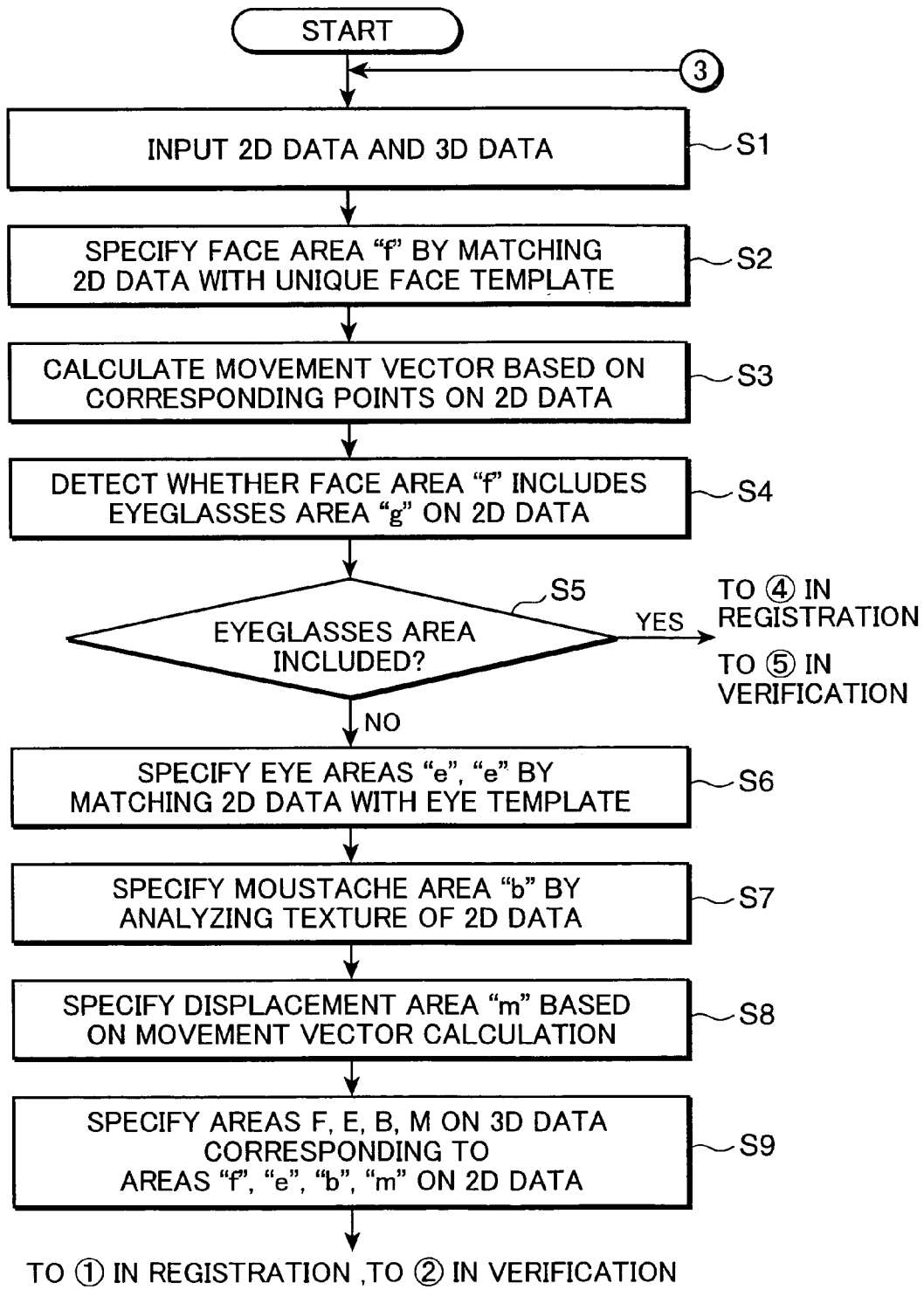
FIG. 14 is a flowchart showing an operation flow to be executed by the face authentication system in accordance with the first embodiment.

In the following, an operation to be executed by the face authentication system in accordance with the first embodiment of the invention is described. FIG. 14 is a flowchart showing an operation flow to be executed by the face authentication system. When the routine of the face authentication system is started, as shown in FIG. 2, two-dimensional image data (hereinafter, called as "2D data") and three-dimensional data (hereinafter, called as "3D data") concerning the subject H are synchronously obtained by the three-dimensional digitizer 30 and the digital camera 40, and the 2D data and the 3D data are inputted to the main body 53 of the personal computer 50 (Step S1). Two consecutive images are acquired as the 2D data to detect a displacement area "m". The 2D data and 3D data are temporarily stored in the RAM 55.

Then, the 2D data is read out, and the template matcher 572 performs a process of matching the 2D data with the unique face template TP1 as shown in FIG. 7 to specify the face area "f" of the subject H (Step S2). Then, the movement vector calculator 573 calculates a movement vector based on the 2D data on the two consecutive images (Step S3). Then, the eyeglasses detector 574 detects whether the face area "f" includes the eyeglasses area "g" (Step S4).

If the eyeglasses detector 574 detects that the face area "f" includes the eyeglasses area "g" (YES in Step S5), a detection signal indicating the presence of the eyeglasses area "g" is immediately outputted to the quality rater 582. Upon receiving the detection signal, the quality rater 582 generates the first quality data indicating the presence of the eyeglasses area "g", and outputs the first quality data to the judger 583. Upon receiving the first quality data, at the time of registration by the register machine 10, the judger 583 judges that a registration process is not to be executed, and causes the display section 51 to display a message for prompting the user to input 2D data and 3D data again via the authentication processor 585 (Step S15, see FIG. 15). On the other hand, at the time of verification by the verifying machine 20, the judger 583 judges that a verification process is not to be executed, and causes the speaker SP to output an alert sound for prompting the user to input 2D data and 3D data again via the authentication processor 585A (Step S25, see FIG. 16).

If the eyeglasses detector 574 detects that the face area "f" does not include the eyeglasses area "g" on the 2D data (NO in Step S5), the template matcher 572 perform a process of matching the 2D data on the face area "f" with the eye template TP2 to specify the eye areas "e" and "e" (Step S6). Then, the texture analyzer 575 performs texture analysis with respect to the 2D data on the face area "f" to specify the moustache area "b" (Step S7). Then, the movement vector calculator 573 specifies an area where the movement vector calculated in Step S3 is larger than the predetermined threshold value, as the displacement area "m" (Step S8). The data on the face area "f", the moustache area "b", and the displacement area "m" specified as described above are outputted to the quality rater 582.

The data on the face area "f", the moustache area "b", and the displacement area "m" specified as described above are also outputted to the data projector 581. Upon receiving the data, the data projector 581 projects the respective areas on the 2D data onto the 3D data D2 to specify the face area F, the eye areas E and E, the moustache area B, and the displacement area M on the 3D data D2 (Step S9).

Figure 15:
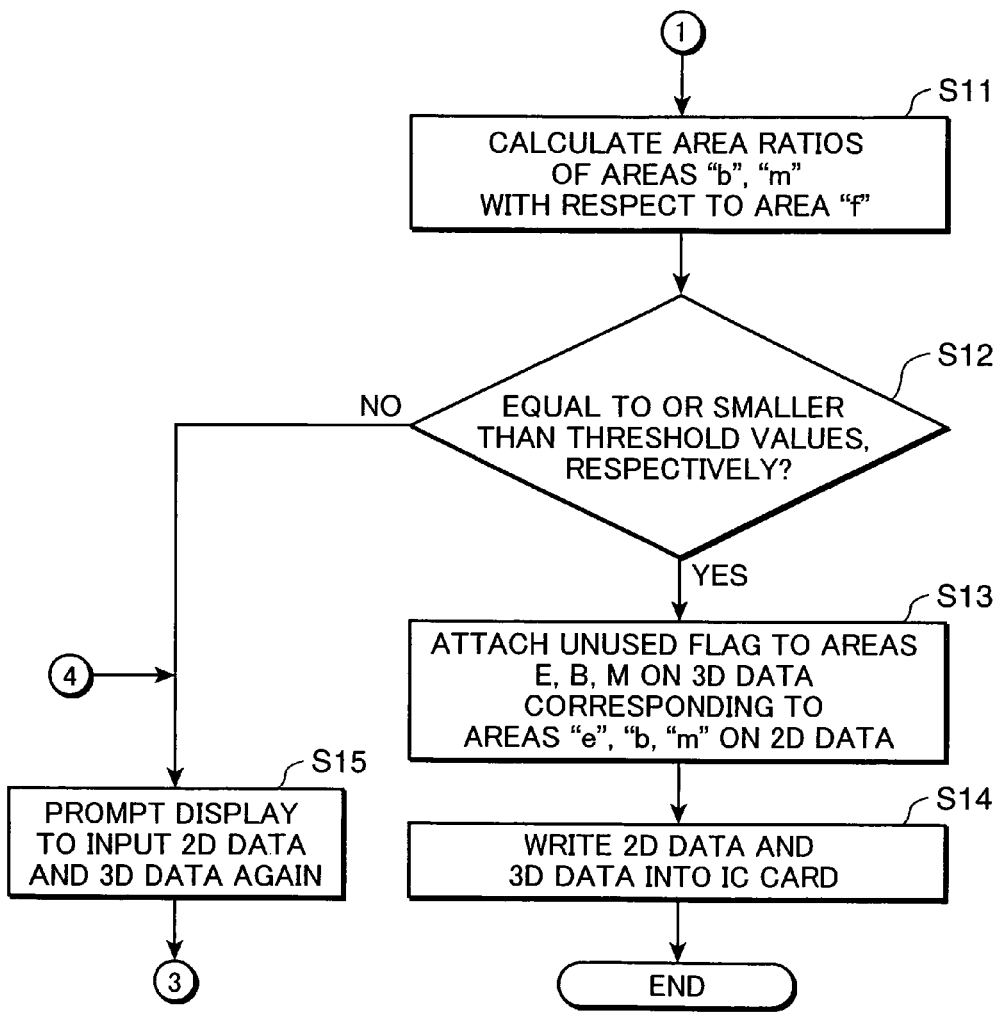
FIG. 15 is a flowchart showing an operation to be executed after Step S9 in FIG. 14 in registering authentication data.

FIG. 15 is a flowchart to be executed after Step S9 in registering authentication data with use of the register machine 10. In this case, the quality rater 582 calculates an area ratio of the moustache area "b" and an area ratio of the displacement area "m" with respect to the face area "f" (Step S11). The data on the area ratios i.e. the second and the third quality data is outputted to the judger 583 to judge whether the area ratios are larger than predetermined threshold values, respectively (Step S12).

If the area ratios of the moustache area "b" and the displacement area "m" are equal to or smaller than the predetermined threshold values, respectively (YES in Step S12), the judgment result shows that the quality of the 3D data D2 is good, and a registration process is executed. Specifically, the flag attacher 584 attaches an unused flag i.e. an invalid flag to 3D data having a coordinate point in the eye areas E and E, the moustache area B, and the displacement area M on the 3D data D2 (Step S13). Thereafter, the authentication processor 585 causes the IC card writer 61 to write the currently inputted 2D data and 3D data into the IC card 70, as authentication data (Step S14).

If, on the other hand, the area ratios of the moustache area "b" and the displacement area "m" are larger than the predetermined threshold values, respectively (NO in Step S12), the judgment result indicates that the quality of the 3D data D2 is poor, and the authentication processor 585 causes the display section 51 to display a predetermined message or a like indication for prompting the user to input 2D data and 3D data again (Step S15). Thereafter, the routine returns to Step S1 in FIG. 14, and the aforementioned operations are repeated.

Figure 16:
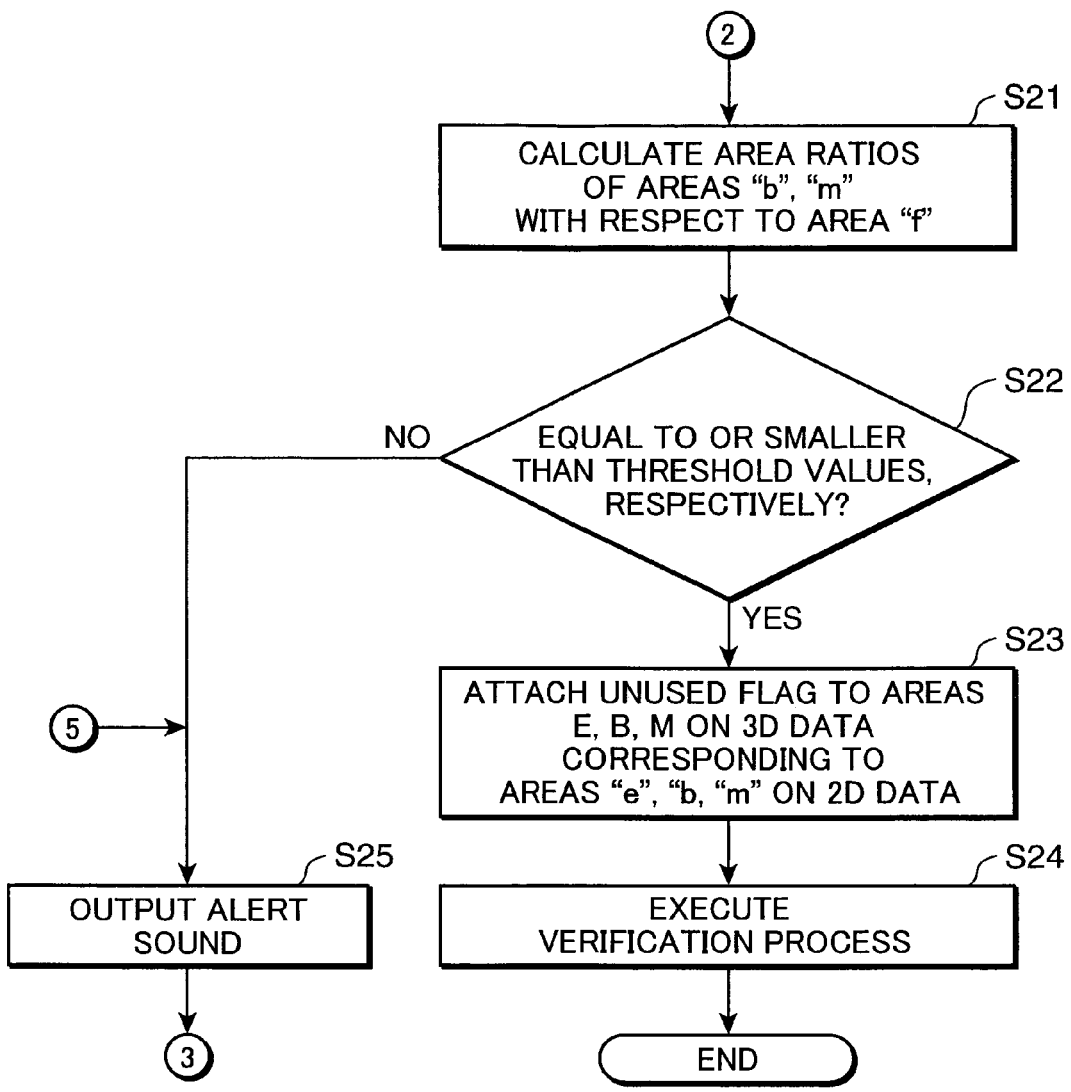
FIG. 16 is a flowchart showing an operation to be executed after Step S9 in FIG. 14 in verifying authentication data.

FIG. 16 is a flowchart to be executed after Step S9 in performing a verification process with use of the verifying machine 20. Similarly to the control to be executed by the register machine 10, an area ratio of the moustache area "b" and an area ratio of the displacement area "m" with respect to the face area "f" are calculated (Step S21), and it is judged whether the area ratios of the moustache area "b" and the displacement area "m" are larger than the predetermined threshold values, respectively (Step S22).

If the area ratios of the moustache area "b" and the displacement area "m" are equal to or smaller than the predetermined threshold values, respectively (YES in Step S22), the judgment result indicates that the quality of the 3D data D2 is good, and a verification process is executed. Specifically, the flag attacher 584 attaches an unused flag i.e. an invalid flag to 3D data having a coordinate point in the eye areas E and E, the moustache area B, and the displacement area M on the 3D data D2 (Step S23). Thereafter, the authentication processor 585A causes the IC card reader 62 to read the data recorded in the IC card 70, and executes a process of matching the recorded data with the currently inputted 2D data and 3D data (Step S24).

If, on the other hand, the area ratios of the moustache area "b" and the displacement area "m" are larger than the predetermined threshold values, respectively (NO in Step S22), the judgment result indicates that the quality of the 3D data D2 is poor, and the authentication processor 585A causes the speaker SP to output an alert sound for prompting the user to input 2D data and 3D data again (Step S25). Thereafter, the routine returns to Step S1 in FIG. 14, and the aforementioned operations are repeated.

In the embodiment, in the case where the area ratios of the moustache area, the displacement area, and the low contrast area are over the respective predetermined threshold values, the registration process or the verification process is not executed, assuming that the quality is poor. Alternatively, the judgment as to whether the registration process or the verification process is to be executed may be performed by totally evaluating these three areas. Specifically, assuming that the area ratios of the moustache area, the displacement area, and the low contrast area are respectively $A_b$, $A_m$, $A_c$, a single numerical value Q as a total quality rating value is obtained by the following equation. Then, a judgment is made as to whether the quality is good by judging whether the value of Q is over a predetermined threshold value so as to judge whether the registration process or the verification process is to be executed.

$$Q=(A_b)^m+(A_m)^m+(A_c)^m$$

where m is a predetermined value representing an exponential power.

In use of the face authentication system in accordance with the first embodiment, the quality rater 582 rates the quality of the three-dimensional data D2 based on the two-dimensional image data D1. This enables to easily and accurately recognize a missing condition of three-dimensional data resulting from eyeglasses, a moustache/beard, a positional displacement, or the like. Thus, the quality of the three-dimensional data D2 can be accurately rated at the time of registering or verifying the three-dimensional data D2. This allows for precise registration and authentication.

Second Embodiment

In the first embodiment, the three-dimensional digitizer 30 is used as the first data input section, and the digital camera 40 is used as the second data input section. In the second embodiment, a multi-point stereo camera system is adopted, wherein two digital cameras 40A and 40B are used, in place of the three-dimensional digitizer 30.

Figure 17:
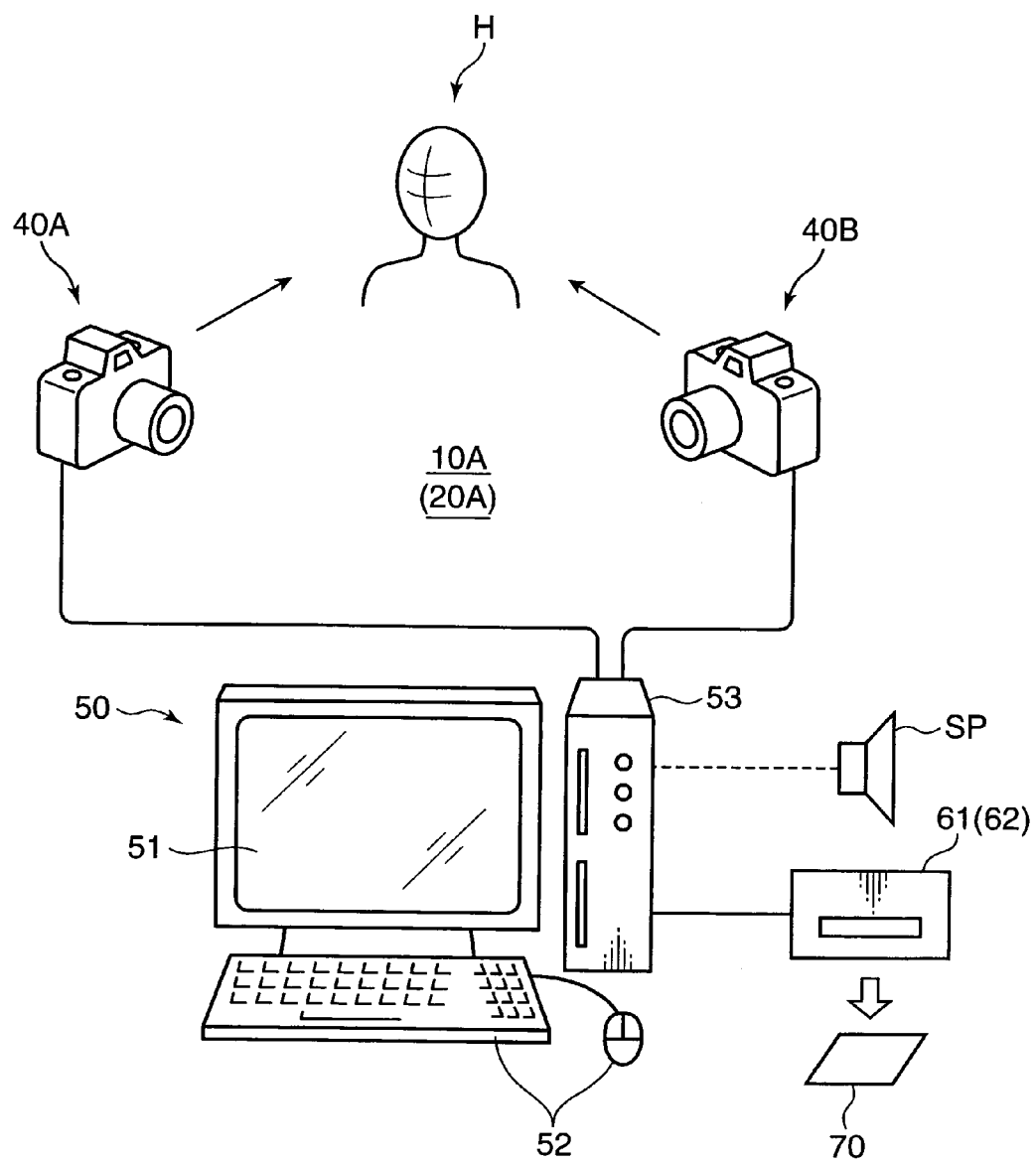
FIG. 17 is a diagram showing a hardware configuration of a register machine or a verifying machine of a face authentication system in accordance with a second embodiment of the invention.
Figure 18:
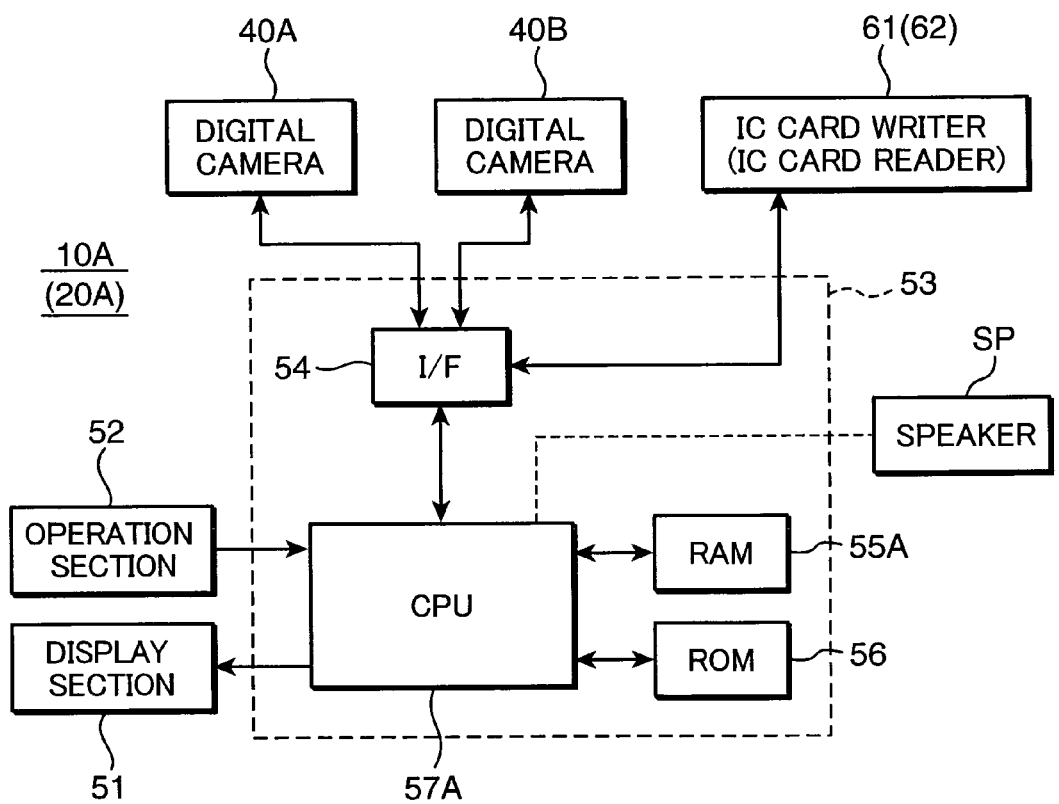
FIG. 18 is a block diagram showing a schematic arrangement of a main body of a personal computer to be used in the face authentication system of the second embodiment.

FIG. 17 is a diagram showing a hardware configuration of a register machine 10A or a verifying machine 20A in accordance with a second embodiment of the invention. The second embodiment is substantially the same as the first embodiment except that a pair of digital cameras 40A and 40B serving as a first data input section and a second data input section are stereoscopically arranged at such positions that viewing directions thereof are different from each other. FIG. 18 is a block diagram showing a schematic arrangement of a main body 53 of a personal computer 50. The arrangement of the computer main body 53 in the second embodiment is substantially the same as that of the computer main body 53 illustrated in FIG. 3 except that the computer main body 53 in the second embodiment includes an RAM 55A and a CPU 57A having a slightly different functional arrangement from that of the RAM 55 and the CPU 57 in the first embodiment.

The digital cameras 40A and 40B are adapted to capture face images of a subject at different positions relative to each other. In the multi-point stereo camera system, stereoscopic corresponding points on two face images captured by the digital cameras 40A and 40B are defined, and a three-dimensional shape of an object to be measured is obtained by triangulation utilizing a viewing angle difference, based on the stereoscopic corresponding points and the positional relation between the digital cameras 40A and 40B. Although not illustrated in FIG. 17, it is desirable to provide a light source device capable of performing laser light projection, slit light projection, pattern light projection, random pattern light projection, or a like projection in order to positively create characterizing points i.e. stereoscopic corresponding points on a face area of a subject. Considering that a face area is incapable of providing sufficient image data on texture except for the eye areas, it is desirable to project random pattern light to prevent mismatching of stereoscopic corresponding points.

One of the digital cameras 40A and 40B is defined as a main camera, and two frames of two-dimensional image data are acquired by causing the main camera to consecutively capture a face image of the subject. This is performed to obtain a displacement area in the similar manner as the first embodiment. Another two frames of two-dimensional image data are obtained by causing the other of the digital cameras 40A and 40B to capture a face image of the subject in synchronism with the image capturing operation by the main camera.

Figure 19:
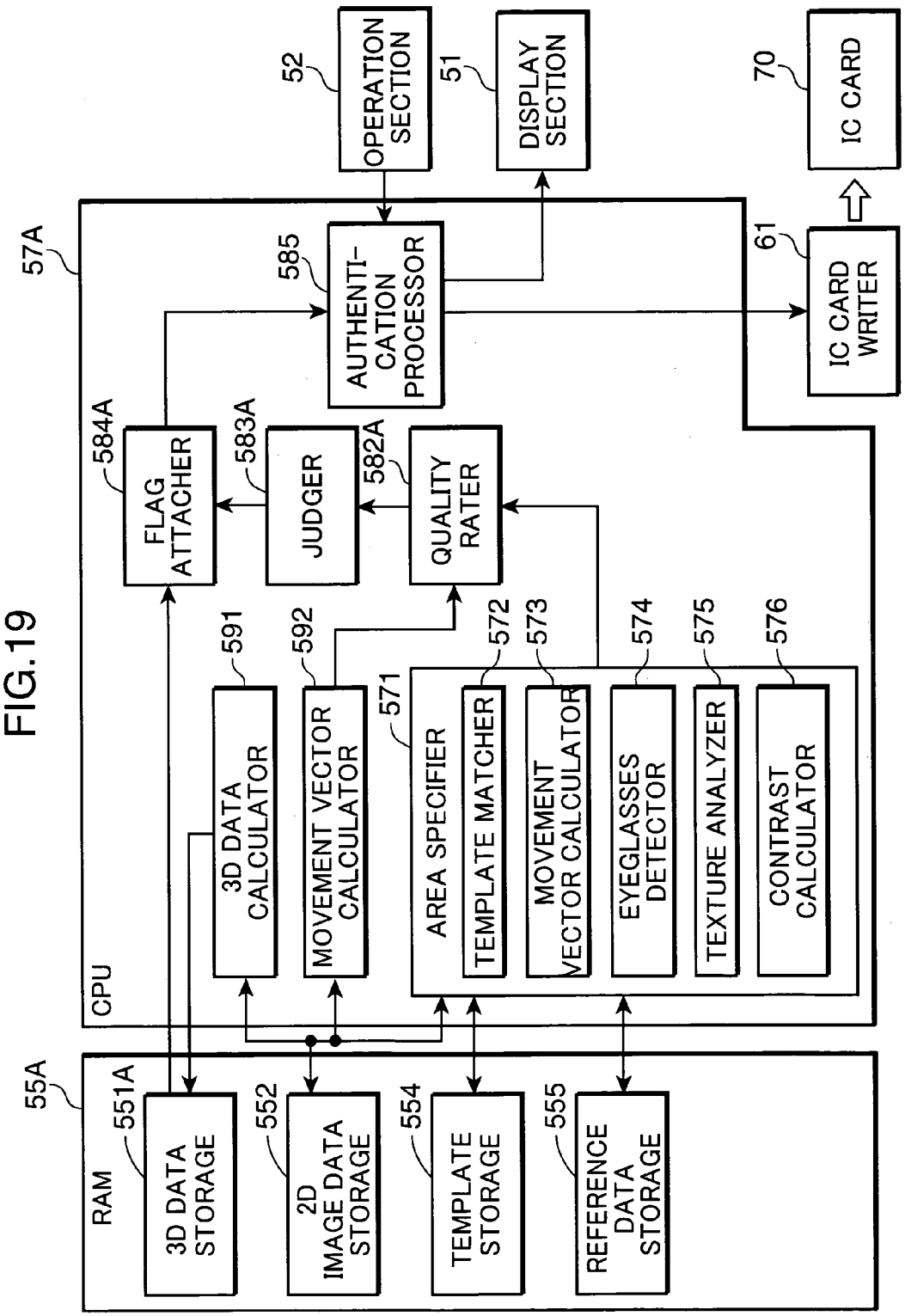
FIG. 19 is a functional block diagram showing a functional arrangement of a CPU of the register machine in the second embodiment.
Figure 20:
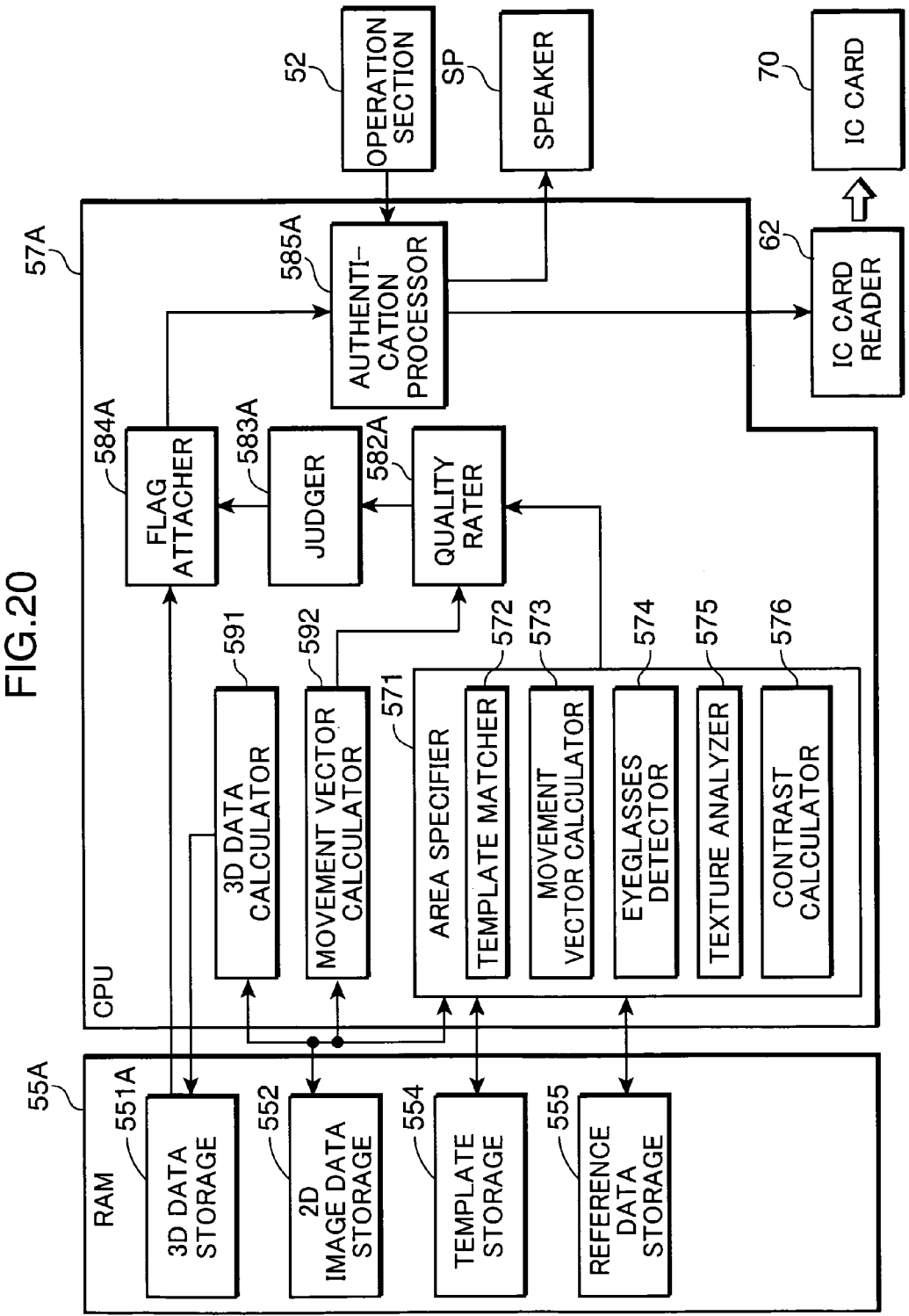
FIG. 20 is a functional block diagram showing a functional arrangement of a CPU of the verifying machine in the second embodiment.

FIG. 19 is a functional block diagram showing a functional arrangement of the CPU 57A of the register machine 10A in correlation with data to be temporarily stored in the RAM 55A. FIG. 20 is a functional block diagram showing a functional arrangement of the CPU 57A of the verifying machine 20A in correlation with data to be temporarily stored in the RAM 55A. Since the elements in FIGS. 19 and 20 with the same reference numerals as those in FIGS. 3 and 4 indicate functional parts having the same functions as the corresponding functional parts shown in FIGS. 3 and 4, description thereof is omitted or briefly described, and the functional parts different from those in FIGS. 3 and 4 are described in detail. Similarly to the arrangement described referring to FIGS. 3 and 4, the functional parts of the register machine 10A and the functional parts of the verifying machine 20A are common to each other.

Unlike the first embodiment, the CPU 57A includes a three-dimensional data calculator 591 and a defocus calculator 592; and an area specifier 571 includes a contrast calculator 576. The CPU 57A includes a quality rater 582A, a judger 583A, and a flag attacher 584A for performing different operations from those of the corresponding elements in the first embodiment, in view of the arrangement that the three-dimensional data calculator 591, the defocus calculator 592, and the contrast calculator 576 are additionally provided in the second embodiment.

The three-dimensional data calculator 591 reads out two-dimensional image data D1 which has been inputted from the digital cameras 40A and 40B and stored in a two-dimensional image data storage 552, and calculates a three-dimensional coordinate i.e. three-dimensional data D2 with respect to each of the stereoscopic corresponding points. The three-dimensional data D2 is temporarily stored in a three-dimensional data storage 551A of the RAM 55A. In this operation, since a three-dimensional coordinate point is calculated in association with a two-dimensional pixel, an image coordinate on the two-dimensional image data D1, and a three-dimensional coordinate on the three-dimensional data D2 are stored in association with the pixel number.

The defocus calculator 592 determines a degree of defocus with respect to the entirety of the two-dimensional image, based on the two-dimensional image data D1. In this embodiment, since the three-dimensional data D2 is calculated based on the two-dimensional image data D1, if the captured image is defocused, accurate three-dimensional coordinate data cannot be derived, which may lower the precision in authentication. In view of this, the face authentication system in accordance with the second embodiment is configured in such a manner that the judger 583A judges that a registration process and a verification process are not to be executed, if a detected defocus amount is over a predetermined value. The defocus calculator 592 is operative to detect a defocus degree with respect to the entirety of the two-dimensional image in order to provide information for the judgment. Various known approaches may be used as the method for calculating a defocus degree. For instance, an approximation method using a blur function with respect to a focused image may be used.

The contrast calculator 576 detects whether the two-dimensional image data D1 includes a low contrast area, and specifies an area where the contrast is smaller than a predetermined value, as a low contrast area. If an illumination condition is not proper, or a shadow is formed due to some drawback in acquiring the two-dimensional image data D1, a desirable contrast may not be obtained from the face area. In such a case, the quality of the three-dimensional data D2 may also be degraded. In view of this, in the second embodiment, the contrast calculator 576 is operative to specify a low contrast area "c", and the quality rater 582A outputs data on the low contrast area "c".

The contrast calculator 576 specifies the low contrast area "c" based on luminance information on the respective pixels. For instance, assuming that a maximum luminance value in a local area is $I_{max}$ and a minimum luminance value in the local area is $I_{min}$, then, a pixel group area where a value represented by the following formula is equal to or smaller than a predetermined threshold value can be specified as the low contrast area "c".

$$(I_{max} - I_{min})/(I_{max} + I_{min})$$

The quality rater 582A estimatively rates the quality of the three-dimensional data D2, based on the two-dimensional image data D1, on which the aforementioned defocus degree and the low contrast area "c" are detected, in addition to a face area "f", an eyeglasses area "g", a moustache area "b", and a displacement area "m" specified in the similar manner as the first embodiment; and generates quality data. Specifically, the quality rater 582A generates the following quality data in the second embodiment.

(d) first quality data indicating whether the face area "f" includes the eyeglasses area "g", based on an output from an eyeglasses detector 574;

(e) second quality data indicating the area ratio of the moustache area "b" with respect to the face area "f", based on an output from a texture analyzer 575;

(f) third quality data indicating the area ratio of the displacement area "m" with respect to the face area "f", based on an output from a movement vector calculator 573;

(g) fourth quality data indicating the area ratio of the low contrast area "c" with respect to the face area "f", based on an output from the contrast calculator 576; and (h) fifth quality data indicating whether the image of the face area "f" includes a defocused portion having a defocus degree equal to or larger than a predetermined threshold value, based on an output from the defocus calculator 592.

The judger 583A determines whether a registration process or a verification process is to be executed by an authentication processor 585 or 585A, based on the first through the fifth quality data. Judgments on the first through the third quality data are the same as those in the first embodiment. Concerning the fourth quality data, judgment indicating that a registration process is not to be executed is made, if the area ratio of the low contrast area "c" is larger than a predetermined threshold value, because precise authentication based on the low contrast area "c" is less feasible or infeasible. Concerning the fifth quality data, judgment indicating a registration process is not to be executed is made if the data outputted from the defocus calculator 592 indicates that the image of the face area "f" includes a defocused portion.

A flag attacher 584A specifies a face area F, eye areas E, E, a moustache area B, a displacement area M, and a low contrast area C on the three-dimensional data D2 in correspondence to the face area "f", the eye areas "e" and "e", the moustache area "b", the displacement area "m", and the low contrast area "c" which have been specified on the two-dimensional image data D1, if the judgment result indicates that a registration process is to be executed. In the second embodiment, the respective areas can be specified by the pixel number, without performing data projection.

Then, the flag attacher 584A attaches an unused flag i.e. an invalid flag to three-dimensional data having a coordinate point within the eye areas E and E, the moustache area B, the displacement area M, and the low contrast area C on the three-dimensional data D2. On the other hand, the flag attacher 584A attaches a use flag i.e. a valid flag to three-dimensional data having a coordinate point within the face area F other than the eye areas E and E, the moustache area B, the displacement area M, and the low contrast area C.

The authentication processor 585, 585A performs overall control of causing the functional parts in the CPU 57A to perform the respective operations at a proper timing in response to an operation signal inputted from the user through an operation section 52. The process to be executed by the authentication processor 585 in the register machine 10A, and the process to be executed by the authentication processor 585A in the verifying machine 20A are the same as the corresponding processes described in the first embodiment.

In the following, an operation to be executed by the face authentication system having the above arrangement in accordance with the second embodiment is described. FIG. 19 is a flowchart showing an operation flow to be executed by the face authentication system. When the routine is started, as shown in FIG. 17, two-dimensional image data (hereinafter, called as "2D data") concerning a subject H is inputted from the digital cameras 40A and 40B. Then, the three-dimensional data calculator 591 calculates three-dimensional data (hereinafter, called as "3D data") based on the 2D data (Step S31). One of the digital cameras 40A and 40B consecutively captures two face images of the subject H to detect a displacement area "m". The 2D data and the 3D data are temporarily stored in the RAM 55A.

Then, the 2D data is read out. Similarly to the first embodiment, the face area "f" of the subject H is specified (Step S32), a movement vector is calculated (Step S33), and judgment is made whether the face area "f" includes the eyeglasses area "g" (Step S34). Then, the defocus calculator 592 calculates a defocus degree with respect to the entirety of the two-dimensional image (Step S35).

If the eyeglasses detector 574 detects that the face area "f" includes the eyeglasses area "g" on the 2D data, or if the defocus calculator 592 detects a defocus amount over a reference value (YES in Step S36), a detection signal indicating the judgment result is immediately outputted to the quality rater 582A. Upon receiving the detection signal, the quality rater 582A immediately generates the first quality data indicating the presence of the eyeglasses area "g" and/or the fifth quality data indicating the presence of a defocused portion, and outputs the quality data to the judger 583A. Upon receiving the quality data, at the time of registration by the register machine 10A, the judger 583A judges that a registration process is not to be executed, and causes a display section 51 to display a message for prompting the user to input 2D data and 3D data again via the authentication processor 585 (Step S55, see FIG. 22). On the other hand, at the time of verification by the verifying machine 20A, the judger 583A judges that a verification process is not to be executed, and causes a speaker SP to output an alert sound for prompting the user to input 2D data and 3D data again via the authentication processor 585A (Step S65, see FIG. 23).

If the eyeglasses detector 574 detects that the face area "f" does not include the eyeglasses area "g", or if the defocus calculator 592 does not detect a defocus amount over the reference value (NO in Step S36), similarly to the first embodiment, the eye areas "e" and "e" are specified (Step S37), the moustache area "b" is specified (Step S38), and the displacement area "m" is specified (Step S39). Then, the contrast calculator 576 judges whether the face area "f" includes a low contrast area on the two-dimensional image data D1, and specifies the low contrast area "c" if the judgment result is affirmative (Step S40). The detection results on the face area "f", the moustache area "b", the displacement area "m", and the low contrast area "c" that have been specified as described above are outputted to the quality rater 582A.

The flag attacher 584A checks the pixel number corresponding to the face area "f", the eye areas "e" and "e", the moustache area "b", the displacement area "m", and the low contrast area "c" on the 2D data, and specifies a face area F, eye areas E and E, a moustache area B, a displacement area M, and a low contras area C on the 3D data D2 (Step S41).

FIG. 22 is a flowchart to be executed after Step S41 in registering authentication data with use of the register machine 10A. In this case, the quality rater 582A calculates an area ratio of the moustache area "b", an area ratio of the displacement area "m", and an area ratio of the low contrast area "c" with respect to the face area "f" (Step S51). The data on the area ratios i.e. the second through the fourth quality data are outputted to the judger 583A to judge whether the area ratios are larger than predetermined threshold values, respectively (Step S52).

If the area ratios of the moustache area "b", the displacement area "m", and the low contrast area "c" are equal to or smaller than the predetermined threshold values, respectively (YES in Step S52), the judgment result shows that the quality of the 3D data D2 is good, and a registration process is executed. Specifically, the flag attacher 584A attaches an unused flag i.e. an invalid flag to 3D data having a coordinate point in the eye areas E and E, the moustache area B, the displacement area M, and the low contrast area C on the 3D data D2 (Step S53). Thereafter, the authentication processor 585 causes an IC card writer 61 to write the currently inputted 2D data and 3D data into an IC card 70, as authentication data (Step S54).

If, on the other hand, one of the area ratios of the moustache area "b", the displacement area "m", and the low contrast area "c" is larger than the corresponding predetermined threshold value (NO in Step S52), the judgment result indicates that the quality of the 3D data D2 is poor, and the authentication processor 585A causes the display section 51 to display a predetermined message or a like indication for prompting the user to input 2D data and 3D data again (Step S55). Thereafter, the routine returns to Step S31 in FIG. 21, and the aforementioned operations are repeated.

FIG. 23 is a flowchart to be executed after Step S41 in performing a verification process with use of the verifying machine 20A. Similarly to the control to be executed by the register machine 10A, an area ratio of the moustache area "b", an area ratio of the displacement area "m", and an area ratio of the low contrast area "c" are calculated with respect to the face area "f" (Step S61), and it is judged whether the area ratios of the moustache area "b", the displacement area "m", and the low contrast area "c" are larger than the predetermined threshold values, respectively (Step S62).

If the area ratios of the moustache area "b", the displacement area "m", and the low contrast area "c" are equal to or smaller than the predetermined threshold values, respectively (YES in Step S62), the judgment result indicates that the quality of the 3D data D2 is good, and a verification process is executed. Specifically, the flag attacher 584A attaches an unused flag i.e. an invalid flag to 3D data having a coordinate point in the eye areas E and E, the moustache area B, the displacement area M, and the low contrast area C on the 3D data D2 (Step S63). Thereafter, the authentication processor 585A causes an IC card reader 62 to read the data recorded in the IC card 70, and executes a process of matching the recorded data with the currently inputted 2D data and 3D data (Step S64).

If, on the other hand, one of the area ratios of the moustache area "b", the displacement area "m", and the low contrast area "c" is larger than the corresponding predetermined threshold value (NO in Step S62), the judgment result indicates that the quality of the 3D data D2 is poor, and the authentication processor 585A causes the speaker SP to output an alert sound for prompting the user to input 2D data and 3D data again (Step S65). Thereafter, the routine returns to Step S31 in FIG. 21, and the aforementioned operations are repeated.

In the face authentication system in accordance with the second embodiment, the quality rater 582A rates the quality of the three-dimensional data D2 based on the two-dimensional image data D1, using the multi-point stereo camera system. This enables to easily and accurately recognize a missing condition of three-dimensional data resulting from eyeglasses, a moustache/beard, a positional displacement, a low contrast, a defocus, or the like. Thus, the quality of the three-dimensional data D2 can be accurately rated at the time of registering or verifying the three-dimensional data D2. This allows for precise registration and authentication.

The invention has been described based on the foregoing embodiments, but is not limited thereto. For instance, the following modifications may be applied.

(1) In the first embodiment, in both of the register machine 10 and the verifying machine 20, the three-dimensional digitizer 30 and the digital camera 40 are used as data input sections. In the second embodiment, in both of the register machine 10A and the verifying machine 20A, the digital cameras 40A and 40b in pair are used as data input sections. Alternatively, a three-dimensional digitizer may be used in one of the register machine and the verifying machine, and a multi-point stereo camera system may be adopted in the other one of the verifying machine and the register machine.

(2) In the foregoing embodiments, the eye areas "e" and "e" are detected on the two-dimensional image data, and an unused flag is attached to the eye areas E and E on the three-dimensional data corresponding to the eye areas "e" and "e" to restrict use of the eye areas "e" and "e" for authentication. Alternatively, the eye areas "e" and "e" may be included in the judging area "d" without detecting the eye areas "e" and "e".

(3) In the foregoing embodiments, in the case where the eyeglasses area "g" is detected, a registration process and a verification process are not executed. Alternatively, the eyeglasses area "g" may also be specified by a texture analyzer or a like device, and an unused flag may be attached to an area on the three-dimensional data corresponding to the eyeglasses area "g" so that a registration process and a verification process are executed with respect to the eyeglasses area "g".

(4) In the case where the judger 583A judges that a registration process or a verification process with respect to the IC card 70 is not to be executed, the display section 51 may be operative to display specific information for prompting the user to change a condition for acquiring two-dimensional data and three-dimensional data by the digital camera 40 and the three-dimensional digitizer 30, or by the digital cameras 40A and 40B, for instance, a message "Please take a photo while facing the front", a message for prompting the user to change a photographing condition such as an illumination condition, or an image for allowing the user to select a photographing condition. Further alternatively, the authentication processor 585, 585A may be so configured as to generate a control signal for automatically changing the photographing condition or a like condition of the digital camera 40 and the three-dimensional digitizer 30. In the latter modification, in the case where the acquired two-dimensional data and three-dimensional data are inappropriate, a notification signal for prompting the user to change the condition for acquiring two-dimensional data and three-dimensional data, or a control signal for changing the data acquisition condition is generated. This is advantageous in allowing the user to re-execute an operation for acquiring two-dimensional data and three-dimensional data in a desirable condition.

(5) In the foregoing embodiments, the face authentication system is realized by letting the subject carry the IC card 70. Alternatively, in place of using the IC card 70, a verification process may be executed by: recording authentication data in a center server via the register machine 10 or 10A; interactively connecting the center server with the verifying machine 20 or 20A via the Internet or a like network; and reading out the authentication data from the center server in verification.

(6) In the foregoing embodiments, the quality of three-dimensional data is rated based on the area ratios of the moustache area, the displacement area, and the low contrast area with respect to the face area. Alternatively, the quality of three-dimensional data may be rated by referring to a feature of the moustache/beard e.g. the color or thickness of moustache/beard, a degree of data displacement, or a degree of low contrast, in place of or in addition to the area ratios.

(7) The registration method or the verification method to be implemented by the face authentication system in the foregoing embodiments may be provided as a program. The program may be provided as a program product by recording the program in a computer-readable recording medium, which is an attachment to a computer, such as a flexible disk, a CD-ROM, an ROM, an RAM, or a memory card. Alternatively, the program may be provided by being recorded in a recording medium such as a hard disk incorporated in a computer. Further alternatively, the program may be provided by downloading via a network.

The following is a summary of the embodiments.

A face authentication system according to an aspect of the invention includes: a data processing section for performing a predetermined data processing operation; a first data input section for inputting three-dimensional data on a face area of a subject to the data processing section; and a second data input section for inputting two-dimensional image data on the face area of the subject to the data processing section, the two-dimensional image data corresponding to the three-dimensional data to be inputted to the data processing section, wherein the data processing section includes: a quality rating section for rating the quality of the three-dimensional data based on the two-dimensional image data, and generating quality data, and an authentication processing section for executing a registration process or a verification process of authentication data based on the three-dimensional data, if the quality data satisfies a predetermined requirement.

Preferably, the two-dimensional image data may be acquired in synchronism with acquiring the three-dimensional data.

In the above arrangement, the quality rating section generates the quality data, as an evaluation value on the quality of the three-dimensional data, based on the two-dimensional image data. Generally, three-dimensional data is a group of three-dimensional points arrayed in a grid pattern. It is difficult to rate the quality of the three-dimensional data based on the three-dimensional data itself. It is, however, relatively easy to grasp an external feature of a face area based on two-dimensional image data. In addition to this, it is easy to find correlations between two-dimensional image data and three-dimensional data that have been acquired in synchronism with each other. In view of these merits, the quality of three-dimensional data can be precisely estimated based on two-dimensional image data. If the quality data satisfies a predetermined requirement, precise authentication can be performed by executing the registration process or the verification process of authentication data based on the three-dimensional data.

Preferably, the quality rating section may generate the quality data with respect to the two-dimensional image data, based on one or more judgment factors (a) through (c) to be selected:

(a) a judgment as to whether the face area includes an eyeglasses area;

(b) an area ratio of a moustache/beard area with respect to the face area, or a feature of the mustache/beard; and (c) an area ratio of a displacement area with respect to the face area, or a degree of displacement.

In the above arrangement, the quality data is generated based on the presence, the area ratio, or the degree of the eyeglasses area, the moustache area, and the displacement area, which may be significant factors causing degradation of the quality of three-dimensional data. This is advantageous in accurately rating the quality of the three-dimensional data.

Preferably, multiple two-dimensional image data consecutively acquired from the second data input section may be used in judging whether the face area includes the displacement area.

In the above arrangement, the displacement area can be easily detected by using the multiple two-dimensional image data.

Preferably, the second data input section may include multiple data input sections, and multiple two-dimensional image data acquired from the multiple data input sections are used as data for obtaining the three-dimensional data on the face area of the subject.

In the above arrangement, the face authentication system can be easily configured by using e.g. two digital still cameras, without using a three-dimensional shape measuring device or a like device.

Preferably, the quality rating section may generate the quality data with respect to the two-dimensional image data, based on one or more judgment factors (d) through (h) to be selected:

(d) a judgment as to whether the face area includes an eyeglasses area;

(e) an area ratio of a moustache/beard area with respect to the face area, or a feature of the moustache/beard;

(f) an area ratio of a displacement area with respect to the face area, or a degree of displacement;

(g) an area ratio of a low contrast area with respect to the face area, or a degree of low contrast; and (h) a degree of defocus in an image of the face area.

In an approach of obtaining three-dimensional data on a face area of a subject based on multiple two-dimensional image data, a contrast or a defocus degree may greatly affect the quality of three-dimensional data. The quality data is generated based on the contrast or the defocus degree, in addition to the presence, the area ratio, or the degree of the eyeglasses area, the moustache area, and the displacement area. This is advantageous in accurately rating the quality of the three-dimensional data.

Preferably, the data processing section may further include a data projecting section for correlating a local area in the two-dimensional image data with a local area in the three-dimensional data corresponding to the two-dimensional image data, and the quality rating section may generate the quality data with respect to each of the local areas in the two-dimensional image data.

In the above arrangement, the quality data is generated with respect to each of the local areas such as the moustache area and the displacement area, which have been detected on the two-dimensional image data. This enables to perform individual rating with respect to the local areas. This is advantageous in finely obtaining the quality of the three-dimensional data.

Preferably, the data processing section may further include a determining section for determining whether the three-dimensional data corresponding to the respective local areas is to be used in executing the registration process or the verification process with respect to each of the local areas, based on the quality data obtained with respect to the each of the local areas.

In the above arrangement, if it is judged that the quality of three-dimensional data corresponding to a certain local area is low, a registration process or a verification process is restricted. This enables to configure a flexible and high-precision authentication system.

Preferably, the data processing section may further include a judging section for judging whether the authentication processing section is allowed to execute the registration process or the verification process based on the quality data.

In the above arrangement, in the case where the rating result on the quality of the three-dimensional data is lower than a predetermined reference value, the judging section judges it improper for the authentication processing section to execute the registration process or the verification process. This enables to avoid in advance registration of three-dimensional data of low reliability, or verification based on three-dimensional data of low reliability.

Preferably, the judging section may generate and output a predetermined notification signal, if the judging section judges that the registration process or the verification process is not to be executed.

In the above arrangement, the user is notified by way of e.g. audio information or image information that the three-dimensional data acquired by the first data input section is inappropriate, or is prompted to obtain three-dimensional data again.

Preferably, the quality data may be expressed by a single numerical value concerning multiple quality rating items.

A face authentication method according to another aspect of the invention includes: acquiring three-dimensional data on a face area of a subject; acquiring two-dimensional image data on the face area of the subject, the two-dimensional image data corresponding to the three-dimensional data; rating the quality of the three-dimensional data based on the two-dimensional image data; and executing a registration process or a verification process of authentication data based on the three-dimensional data, if the quality data satisfies a predetermined requirement.

A face authentication method according to yet another aspect of the invention includes: acquiring multiple two-dimensional image data on a face area of a subject at different viewing directions from each other; acquiring three-dimensional data on the face area of the subject based on the acquired multiple two-dimensional image data; rating the quality of the acquired three-dimensional data based on the two-dimensional image data; and executing a registration process or a verification process of authentication data based on the three-dimensional data, if the quality data satisfies a predetermined requirement.

In the face authentication system and the face authentication method of the embodiments of the invention, the quality rating section generates the quality data, as an evaluation value on the quality of three-dimensional data, based on two-dimensional image data. This enables to easily and accurately recognize a missing condition of the three-dimensional data resulting from eyeglasses, a moustache/beard, a positional displacement, or the like. Thus, the quality of the three-dimensional data can be accurately rated at the time of registering or verifying the three-dimensional data. This allows for precise registration and authentication.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A face authentication system, comprising:
   a data processing section for performing a predetermined data processing operation;
   a first data input section for inputting three-dimensional data on a face area of a subject to the data processing section; and
   a second data input section for inputting two-dimensional image data on the face area of the subject to the data processing section, the two-dimensional image data corresponding to the three-dimensional data to be inputted to the data processing section, wherein
   the data processing section includes:
      a quality rating section for rating the quality of the three-dimensional data with respect to the two-dimensional image data based on a state of subject and/or a state of image capturing while acquiring the three-dimensional data, and generating quality data, and
      an authentication processing section for executing a registration process or a verification process of authentication data based on the three-dimensional data, if the quality data satisfies a predetermined requirement.

2. The face authentication system according to claim 1, wherein
   the two-dimensional image data is acquired in synchronism with acquiring the three-dimensional data.

3. The face authentication system according to claim 1, wherein
   rating the quality of the three-dimensional data with respect to the two-dimensional data based on the state of subject and/or the state of image capturing comprise rating,
   based on one or more judgment factors (a) through (c) to be selected:
   (a) a judgment as to whether the face area includes an eyeglasses area;
   (b) an area ratio of a moustache/beard area with respect to the face area, or a feature of the moustache/beard; and
   (c) an area ratio of a displacement area with respect to the face area, or a degree of displacement.

4. The face authentication system according to claim 3, wherein
   multiple two-dimensional image data consecutively acquired from the second data input section are used in judging whether the face area includes the displacement area.

5. The face authentication system according to claim 1, wherein
   the second data input section includes multiple data input sections, and
   multiple two-dimensional image data acquired from the multiple data input sections are used as data for obtaining the three dimensional data on the face area of the subject.

6. The face authentication system according to claim 5, wherein
   rating the quality of the three-dimensional data with respect to the two-dimensional data based on the state of subject and/or the state of image capturing comprise rating,
   based on one or more judgment factors (d) through (h) to be selected:
   (d) a judgment as to whether the face area includes an eyeglasses area;
   (e) an area ratio of a moustache/beard area with respect to the face area, or a feature of the moustache/beard;
   (f) an area ratio of a displacement area with respect to the face area, or a degree of displacement;
   (g) an area ratio of a low contrast area with respect to the face area, or a degree of low contract; and
   (h) a degree of defocus in an image for the face area.

7. The face authentication system according to claim 6, wherein multiple two-dimensional image data consecutively acquired from the second data input section are used in judging whether the face area includes the displacement area.

8. The face authentication system according to claim 1, wherein
the data processing section further includes a data projecting section for correlating a local area in the two-dimensional image data with a local area in the three-dimensional data corresponding to the two-dimensional image data, and
the quality rating section generates the quality data with respect to each of the local areas in the two-dimensional image data.

9. The face authentication system according to claim 8, wherein
the data processing section further includes a determining section for determining whether the three-dimensional data corresponding to the respective local areas is to be used in executing the registration process or the verification process with respect to each of the local areas, based on the quality data obtained with respect to the each of the local areas.

10. The face authentication system according to claim 1, wherein,
the data processing section further includes a judging section for judging whether the authentication processing section is allowed to execute the registration process or the verification process based on the quality data.

11. The face authentication system according to claim 10, wherein
the judging section generates and outputs a predetermined notification signal, if the judging section judges that the registration process or the verification process is not to be executed.

12. The face authentication system according to claim 1, wherein
the quality data is expressed by a single numerical value concerning multiple quality rating items.

13. A face authentication method, comprising:
acquiring three-dimensional data on a face area of a subject;
acquiring two-dimensional image data on the face area of the subject, the two-dimensional image data corresponding to the three-dimensional data;
rating the quality of the three-dimensional data with respect to the two-dimensional image data based on a state of subject and/or a state of image capturing while acquiring the three-dimensional data, and generating quality data; and
executing a registration process or a verification process of authentication data based on the three-dimensional data, if the quality data satisfies a predetermined requirement.

14. A face authentication method, comprising:
acquiring multiple two-dimensional image data on a face area of a subject at different viewing directions from each other;
acquiring three-dimensional data on the face area of the subject based on the acquired multiple two-dimensional image data;
rating the quality of the acquired three-dimensional data with respect to the two-dimensional image data based on a state of subject and/or a state of image capturing while acquiring the three-dimensional data, and generating quality data and
executing a registration process or a verification process of authentication data based on the three-dimensional data, if the quality data satisfies a predetermined requirement.

* * * * *